(12) United States Patent
Srivastava et al.

(10) Patent No.: US 11,418,513 B2
(45) Date of Patent: *Aug. 16, 2022

(54) MULTILAYER ACCESS CONTROL FOR CONNECTED DEVICES

(71) Applicant: McAfee, LLC, Santa Clara, CA (US)

(72) Inventors: Himanshu Srivastava, Bangalore (IN); Dattatraya Kulkarni, Bangalore (IN); Srikanth Nalluri, Bangalore (IN); Krishnapur N. Venkatasubrahmanyam, Bangalore (IN); Kamlesh Halder, West Bengal (IN); Raj Vardhan, Bangalore (IN)

(73) Assignee: McAfee, LLC, San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/945,141

(22) Filed: Jul. 31, 2020

(65) Prior Publication Data

US 2020/0367059 A1 Nov. 19, 2020

Related U.S. Application Data

(63) Continuation of application No. 15/286,821, filed on Oct. 6, 2016, now Pat. No. 10,735,965.

(30) Foreign Application Priority Data

Oct. 7, 2015 (IN) .......................... 5372/CHE/2015

(51) Int. Cl.
*H04W 4/70* (2018.01)
*H04W 12/08* (2021.01)
(Continued)

(52) U.S. Cl.
CPC ........ *H04L 63/102* (2013.01); *H04L 63/0227* (2013.01); *H04L 63/0245* (2013.01);
(Continued)

(58) Field of Classification Search
CPC ............. H04L 63/0227; H04L 63/0245; H04L 63/102; H04L 63/123; H04L 67/20;
(Continued)

(56) References Cited

U.S. PATENT DOCUMENTS

| 8,774,229 B2 * | 7/2014 | Connors | H04N 21/242 370/507 |
| 8,954,573 B2 * | 2/2015 | Hugard, IV | H04W 12/128 709/224 |

(Continued)

*Primary Examiner* — Alexander Lagor
*Assistant Examiner* — D'Arcy Winston Straub
(74) *Attorney, Agent, or Firm* — Byrne Poh LLP

(57) ABSTRACT

A system for controlling accesses to network enabled devices includes a network interface over which a hub communicates with network enabled devices, a processor, and a multilayer access control layer. The access control layer includes instructions that, when executed by the processor, cause the processor to detect, at the hub, a request representing an attempt by an application executing on a remote host device to access a network enabled device communicatively coupled to the hub, characterize the request according to a user of the remote host device, the application making the attempt, and the network enabled device, and determine whether to allow or deny the request based upon the characterization and a plurality of rules. The rules may include definitions of access rights, with respect to the network enabled device, for users, applications, commands or queries made by applications, remote host devices, and network domains.

17 Claims, 10 Drawing Sheets

(51) Int. Cl.
*H04W 12/086* (2021.01)
*H04W 12/088* (2021.01)
*H04L 67/63* (2022.01)
*H04L 9/40* (2022.01)
*H04L 67/53* (2022.01)
*H04W 12/10* (2021.01)

(52) U.S. Cl.
CPC ............. *H04L 67/327* (2013.01); *H04W 4/70* (2018.02); *H04W 12/08* (2013.01); *H04W 12/086* (2021.01); *H04W 12/088* (2021.01); H04L 63/123 (2013.01); H04L 67/20 (2013.01); H04W 12/10 (2013.01)

(58) Field of Classification Search
CPC ...... H04L 67/327; H04W 4/70; H04W 12/08; H04W 12/086; H04W 12/088; H04W 12/10
See application file for complete search history.

(56) References Cited

U.S. PATENT DOCUMENTS

| | | | | |
|---|---|---|---|---|
| 2012/0124201 | A1* | 5/2012 | Muhanna | H04L 69/18 |
| | | | | 709/224 |
| 2013/0142118 | A1* | 6/2013 | Cherian | H04L 45/00 |
| | | | | 370/328 |
| 2016/0072839 | A1* | 3/2016 | Mortimore, Jr. | H04L 63/0876 |
| | | | | 726/1 |
| 2016/0366136 | A1* | 12/2016 | Heldt-Sheller | H04L 63/20 |
| 2018/0255446 | A1* | 9/2018 | Reunamaki | H04W 4/023 |

* cited by examiner

MULTILAYER ACCESS CONTROL FOR CONNECTED DEVICES

CROSS-REFERENCE TO RELATED APPLICATIONS

This application is a continuation of U.S. patent application Ser. No. 15/286,821, filed Oct. 6, 2016, which claims priority from India Provisional Application No. 5372/CHE/2015, filed Oct. 7, 2015, each of which is hereby incorporated by reference herein in its entirety.

TECHNICAL FIELD

The present disclosure relates generally to electronic device security and, more particularly, to controlling accesses to connected devices.

BACKGROUND

The number of Internet of Things (IoT) devices in households is increasing every day. A smart home of the future is expected to include hundreds of these devices. These devices include household items that historically did not include computing or networking capabilities, but into which limited computing and networking capabilities have recently been incorporated. For example, a smart light bulb may include one or more components to provide network connectivity such that the light bulb can report data to a network, can be configured by the network, and can be remotely operated via the network. In some cases, IoT devices such as lights, fans, heating and air-conditioning systems, thermostats, automobiles, vehicles, toys, ovens, locks, refrigerators, sensors, smoke alarms, carbon monoxide detectors, doors, windows, washers, dryers, dish-washers, appliances, fitness equipment, consumer electronics, or other household devices are now Internet-capable or intranet-capable. IoT devices are sometimes referred to as "connected devices" or "smart devices".

IoT devices are manufactured and provided by many different entities. Many of these IoT devices are not created or provisioned with any security features. Others include security features that are not compatible with or extensible to a larger security framework of a home or a third party organization that provides security to the home. In addition, IoT devices typically include small form factors with limited processor, memory, or networking resources. Thus, many IoT devices are not easily upgraded or extendable in terms of additional resources or add-on features. The processors for IoT devices are typically small, low-powered processors that are not sufficient to provide access control for the devices. When a household includes a large number of IoT devices of many different types, the difficulty of administering a network of IoT devices is compounded.

DETAILED DESCRIPTION OF EMBODIMENTS

Figure 1:
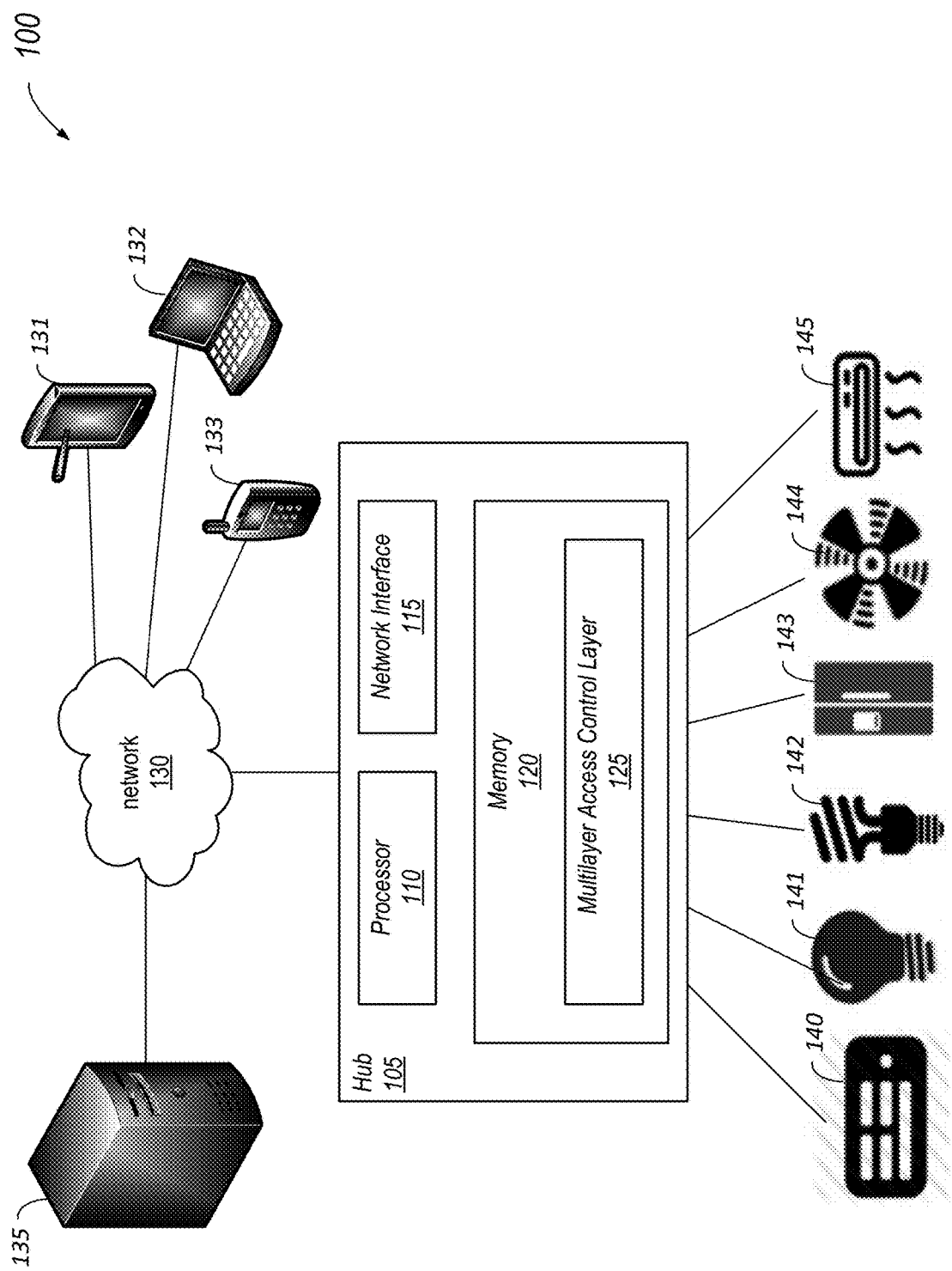
FIG. 1 illustrates a system for controlling accesses to connected devices using a multilayer access control mechanism, according to at least some embodiments of the present disclosure.

The connected devices typically found in homes, which are sometimes referred to as IoT devices, either implement no access control at all or implement access control based solely on user-level authentication. For example, some of these devices are very low powered devices, with very simple low-end chips, that do not understand the notion of a "user". These devices will accept and act on a received command if it is correctly structured, irrespective of how it was sent to them or from whom. When user-level authentication is implemented, any user with a valid user name and password will have access to all of the IoT devices in the home and all of the features of these devices. Therefore, all users in the home have the same level of rights to access these IoT devices. This can be undesirable as more IoT devices controlling sensitive aspects of the home or that perform safety-related functions are introduced into the home. Some IoT devices accept commands from an application executing on a remote host device, such as a smart phone, laptop computer, or tablet computing device. Some IoT devices accept commands from a web based service executing on a remote server. In the current state of the art, correctly structured commands from a rogue server could be accepted by an IoT device. In one example, a child might download a rogue application to change the color of the light bulbs in his room. Unbeknownst to the family, the rogue application might also quietly discover network enabled locked cabinets, e.g., in the background, and send information about them to a malicious web site.

In various embodiments of the present disclosure, a system for controlling accesses to network enabled devices, including IoT devices, may include a network interface over which a hub communicates with network enabled devices, a processor, and a multilayer access control layer. The multilayer access control layer may include instructions that, when executed by the processor, cause the processor to detect, at the hub, a request representing an attempt by an application executing on a remote host device to access a network enabled device that is communicatively coupled to the hub, to characterize the request according to the remote host device, a user of the remote host device, the application making the attempt, the network domain from which the request is received, and the network enabled device itself, and to determine whether to allow or deny the request based upon the characterization and a plurality of rules. The rules may include definitions of access rights, with respect to the network enabled device, for users, applications, specific commands or queries made by applications, remote host devices, and network domains. Due to the granularity with which the multilayer access control layer can determine whether to allow or deny an access request that targets a specific IoT device, the system may provide improved security for these devices in the home, without the need to modify the hardware or the software stack of the IoT devices themselves.

Numerous specific details such as an example hub architecture, IoT device types, remote host device types, user types, web service types, access rights, and access policy types are set forth in order to provide a more thorough understanding of the embodiments of the present disclosure. It will be appreciated, however, by one skilled in the art that embodiments may be practice without such specific details.

FIG. 1 illustrates a system 100 for controlling accesses to connected devices using a multilayer access control mechanism, according to at least some embodiments of the present disclosure. In the example embodiment illustrated in FIG. 1, system 100 includes a hub 105 that is communicatively coupled to a server 135 and to multiple remote host devices, shown as tablet device 131, laptop computer 132, and smart phone 133, over network 130. In at least some embodiment of the present disclosure, one or more web services executing on server 135 may, from time to time, attempt to issue requests to access a connected device that is communicatively coupled to hub 105. Similarly, applications executing on various ones of the remote host devices may provide interfaces through which a user can issue requests to access a connected device that is communicatively coupled to hub 105. Each of these requests may represent a command or query to be issued to the connected device by hub 105 on behalf of a web service executing on a server 135, an application executing on a remote host device, or a user of such a web service or application. In some embodiments, reputation server or knowledge base may be maintained on a server 135 and may be accessible by the multilayer access control layer 125 over network 130. In various embodiments, the multilayer access control layer 125 within hub 105 may be communicatively coupled to the server 135 through a suitable network interface, such as network interface 115.

In various embodiments, the connected devices may include network enabled devices which are communicatively coupled to networks, clouds, and other similar architectures. For example, in one embodiment, the multilayer access control layer 125 within hub 105 may include a unified scheme, protocol, or mechanism to be shared among network edge devices. In another embodiment, the multilayer access control layer 125 within hub 105 may provide access control for devices configured as Internet-of-Things (IoT) devices. In the example embodiment illustrated in FIG. 1, the multilayer access control layer 125 within hub 105 controls accesses to a variety of connected devices, shown as devices 140-145.

In at least some embodiments, IoT devices may be protected by security requirements that define users or specific computing devices that can control the IoT device. In another embodiment, different levels of control may be provided to different users. The different users may be members of a defined group or organization. For example, child users of a family group might not be authorized to turn on an oven or open a safe. In another example, office workers might not be authorized to unlock certain locks within their building. In yet another example, guests of a business or residence might be given access to wireless routers or other computing infrastructure so that the guest may connect to the Internet. However, authorization for the guest might be required to be limited to only a certain router, and the security requirements of the organization might require that the authorization not extend to other IoT devices within the same network. In some embodiments, the systems described herein may control and manage access to IoT devices created or provided by multiple vendors. For example, system 100 illustrated in FIG. 1 may perform such operations even though IoT devices 140-145 include several different types, makes, and models of devices.

In the example embodiment illustrated in FIG. 1, system 100 includes a hub 105 in which a multilayer access control layer 125 is embedded to control and manage accesses to IoT devices 140-145. In other embodiments, the multilayer access control layer 125 may be implemented in any suitable part of the system, such as in another suitable electronic device within system 100. For example, in various embodiments, the multilayer access control layer 125 may be included within a hub, gateway, wireless router, or other device for controlling access to a network at the edge of the network. In one embodiment, the multilayer access control layer 125 may be implemented in a specific class of device to implement their functionality. For example, the hub, gateway, or router may be classified as such a device. In another embodiment, a device that implements multilayer access control layer 125 may manage a connected device, such as one of IoT devices 140-145, through the multilayer access control layer once it joins a network. In various embodiments, the multilayer access control layer 125 within hub 105 may be communicatively coupled to the IoT devices 140-145 through a suitable network interface, such as network interface 115. In at least some embodiments, network interface 115 may include a wireless network interface. For example, the IoT devices may communicate with hub 105 through a network interface that adheres to a wireless communication/connectivity standard such as a Wi-Fi, ZigBee, Z-Wave, Insteon, near field communication (NFC), Z-Wave, RFID, Bluetooth, or Bluetooth low energy (BLE) communication/connectivity protocol. In this example embodiment, multilayer access control layer 125 within hub 105 may also be communicatively coupled via network interface 115 to one or more electronic devices, such as remote host devices 131-133, that, from time to time, attempt to access the IoT devices 140-145.

In at least some embodiments, the multilayer access control layer 125 may be executed by a processor 110 and may include instructions on a memory 120. While a single instance of the multilayer access control layer 125 is shown in FIG. 1 and described below, the functionality described herein may be suitably implemented in any number of instances or types of applications. The multilayer access control layer 125 may be implemented in any suitable manner, such as by a program, application, script, function, library, code, software, firmware, hardware, or other mechanisms for carrying out the functionality described herein.

Various portions of system 100 may include a processor communicatively coupled to a memory. In particular, the multilayer access control layer 125 may execute on a portion of the system 100, such as within the hub 105, and may include instructions loaded on memory 120 to be read and executed by the processor 110. In some embodiments, the multilayer access control layer 125 may include instructions stored on a memory, such as FLASH, that is separate from storage otherwise used in the hub 105. The multilayer access control layer 125, when loaded and executed by the processor 110, may perform some or all of the functionality described herein for controlling accesses to IoT devices.

In some embodiments, the memory 120 may be in the form of physical memory or pages of multi-layer memory. The processor 110 may comprise, for example, a microprocessor, microcontroller, digital signal processor (DSP), application specific integrated circuit (ASIC), or any other digital or analog circuitry configured to interpret and/or execute program instructions and/or process data. In some embodiments, the processor 110 may interpret and/or execute program instructions and/or process data stored in memory 120. Memory 120 may be configured in part or whole as application memory, system memory, or both. Memory 120 may include any system, device, or apparatus configured to hold and/or house one or more memory modules. Each memory module may include any system, device or apparatus configured to retain program instructions and/or data for a period of time (e.g., computer readable storage media). Instructions, logic, or data for configuring the operation of the system may reside in memory 120 for execution by the processor 110.

The processor 110 may execute one or more code instruction(s) to be executed by the one or more cores of the processor 110. The processor cores may follow a program sequence of instructions indicated by the code instructions. Each code instruction may be processed by one or more decoders of the processor 110. The decoder may generate as its output a micro operation such as a fixed width micro operation in a predefined format, or may generate other instructions, microinstructions, or control signals which reflect the original code instruction. The processor 110 may also include register renaming logic and scheduling logic, which generally allocate resources and queue the operation corresponding to the convert instruction for execution. After completion of execution of the operations specified by the code instructions, back end logic within the processor 110 may retire the instruction. In one embodiment, the processor 110 may allow out of order execution but requires in order retirement of instructions. Retirement logic within the processor 110 may take a variety of forms as known to those of skill in the art (e.g., re-order buffers or the like). The processor cores of the processor 110 are thus transformed during execution of the code, at least in terms of the output generated by the decoder, the hardware registers and tables utilized by the register renaming logic, and any registers modified by the execution logic Program instructions may be used to cause a general-purpose or special-purpose processing system that is programmed with the instructions to perform the operations described herein. The operations may be performed by specific hardware components that contain hardwired circuitry or logic for performing the operations, or by any combination of programmed computer components and custom hardware components. Methods may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor 110 to perform an action or produce a result.

In at least some embodiments of the present disclosure, the system described here may prevent unauthorized accesses to network enabled devices, such as IoT devices, with the help of dynamically derived access control tags. For example, in some embodiments, access request events, rather than all being treated the same, may be differentiated along user, device, application, and network dimensions by constructing access control tags and associating the tags with the access requests to control which requests are issued to the target devices and which requests are denied. In some embodiments, associating an access control tag with an access request may include storing, at least temporarily, the access request and the access control tag together in a suitable data structure within a memory on the hub. In some embodiments, associating an access control tag with an access request may include storing, at least temporarily, the access request and the access control tag in an associative structure within a memory on the hub such that the tag is associated with the access request. In some embodiments, by incorporating a multilayer access control layer, such as those described herein, into a smart device hub, the hub may be able to filter commands prior to issuing them to target IoT devices, thus adding a security layer, irrespective of the make, model, or features of the target devices. In at least some embodiments, a multilayer access control layer may include respective sublayers to implement the following types of access controls:

User Access Control
Device Access Control
Application Access Control
Network Access Control In some embodiments, the multilayer access control layer itself may be realized as a software mechanism on the hub. In some embodiments, any type of access directed to an IoT device that is coupled to the hub may be filtered through the multilayer access control layer, which decides whether the access to the target device is allowed or denied. In this way, the IoT devices may respond to only those users, devices, applications, and/or services that have appropriate privilege to access them. In various embodiments, a system that employs a multilayer access control layer such as those described herein may provide the following features:

Every access request, command, query, or message passing to or from an IoT device coupled to a central hub may have to pass through the multilayer access control layer on the hub.

Each sublayer of the multilayer access control layer may virtually tag the access request, command, query, or message as it passes through the multilayer access control layer based on whether it recognizes the origin of the access request, command, query, or message. For example, in some embodiments, a user access control sublayer may perform the recognition of a user according to a user id-password combination. A device access control sublayer may perform device recognition based on media access control (MAC) addresses and/or other network or Internet Protocol (IP) layer signatures. An application access control sublayer may perform application recognition based on the command structure and/or software development kit (SDK) fingerprints. A network access control sublayer may recognize network domains' Internet Protocol (IP)/Uniform Resource Locator (URL) addresses. Each of these sublayers may virtually tag the access request, command, query, or message by associating a tag with the access request, command, query, or message, where the value of the tag is based on whether or not the sublayer recognized the source as being a safe or approved source of access requests, commands, queries, or messages for the IoT device.

After pre-processing and tagging an access request, command, query, or message in one or more sublayers, the multilayer access control layer may apply an access policy generated from information in multiple access maps to determine whether the access request, command, query, or message is allowed to proceed. For example, if the access request, command, query, or message includes appropriate tags conforming to the access policy, the access request, command, query, or message may be issued to the target IoT device. Otherwise, it may be denied.

In at least some embodiments, a multilayer access control layer that includes a hierarchy of access control sublayers, such as the user access control sublayer, device access control sublayer, application access control sublayer and network access control sublayer may reside in or be implemented at a layer over, a smart device hub or another type of home-gateway device to enforce access control for the IoT devices coupled to the hub or home-gateway without having to modify the IoT devices themselves. In some embodiments, the applications may access the multilayer access control layer via a relatively simple access SDK. This access SDK may provide applications for controlling the IoT devices, which executing on various remote host devices, with the means to interact with the multilayer access control layer in order to gain access to the IoT devices. In at least some embodiments of the present disclosure, it may be assumed that the remote host devices in the home that serve as controlling devices and the users who reside in the home are registered with the multilayer access control layer on the hub that controls the IoT devices.

Figure 2:
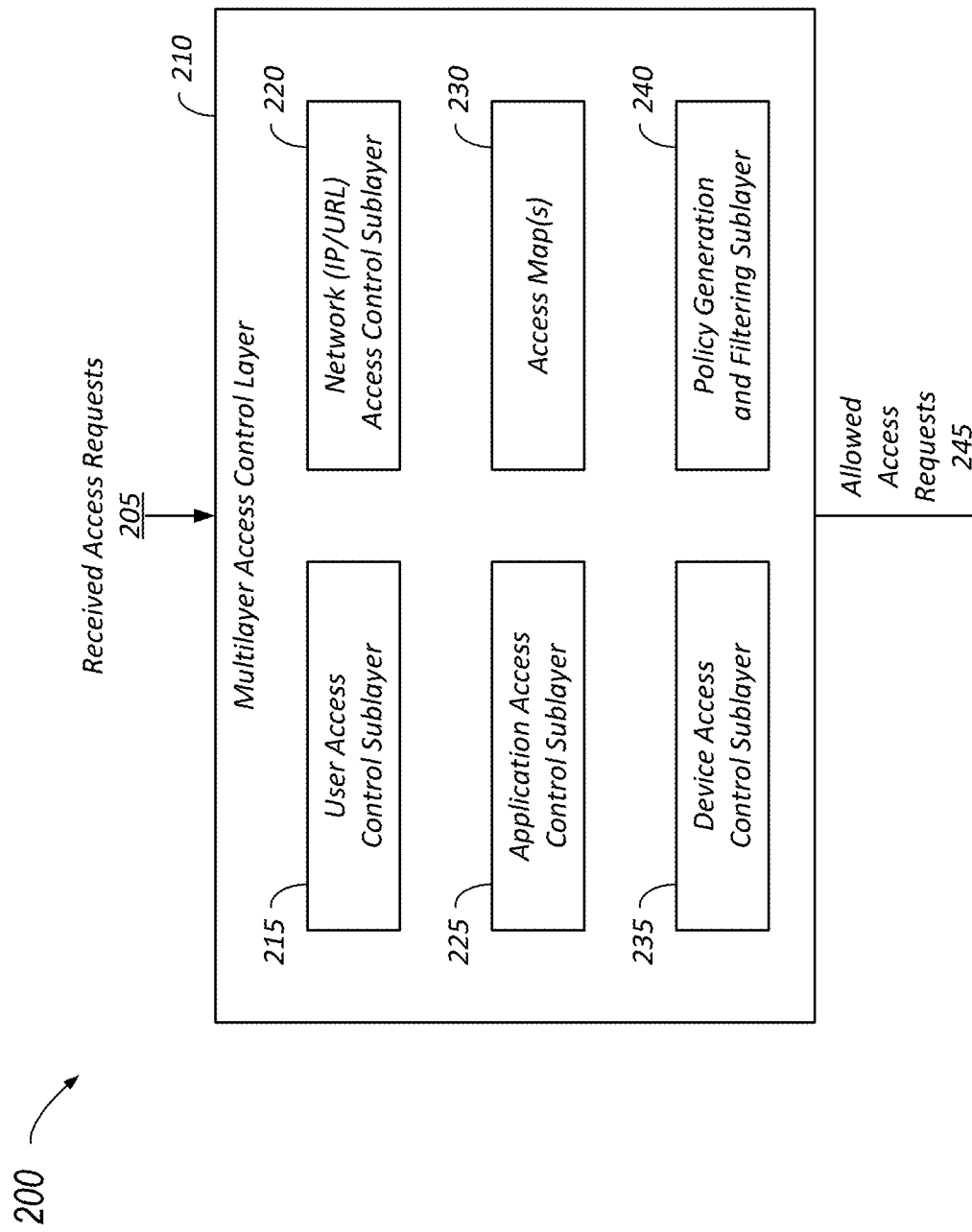
FIG. 2 is block diagram illustrating a multilayer access control layer of a hub, according to at least some embodiments of the present disclosure.

FIG. 2 is block diagram illustrating a system 200 including a multilayer access control layer 210, according to at least some embodiments of the present disclosure. In one embodiment, multilayer access control layer 125 illustrated in FIG. 1 may be implemented by multilayer access control layer 210. In various embodiments, multilayer access control layer 210 may include any suitable number and kind of components. For example, multilayer access control layer 210 may include more, fewer, or different components than those illustrated in FIG. 2. As illustrated in the example embodiment shown in FIG. 2, the multilayer access control layer 210 may receive access requests 205 from any of a variety of sources. After applying multiple filters and rules to the received access requests 205, multilayer access control layer 210 may output allowed access requests 245. Outputting allowed access requests 245 may include providing the allowed access requests 245 directly to the IoT devices they target or otherwise allowing them to be issued to the IoT devices they target. In some embodiments, allowed access requests 245 may represent a subset of received access requests 205 that are not filtered out by any of the components of multilayer access control layer 210. In some embodiments, received access requests 205 that are filtered out by multilayer access control layer 210 may be denied, blocked, or otherwise prevented from being issued to the IoT devices to which they are targeted. In some embodiments, received access requests 205 that are filtered out by multilayer access control layer 210 may be logged for subsequent review by an administrator of the hub on which multilayer access control layer 210 resides.

Figure 5:
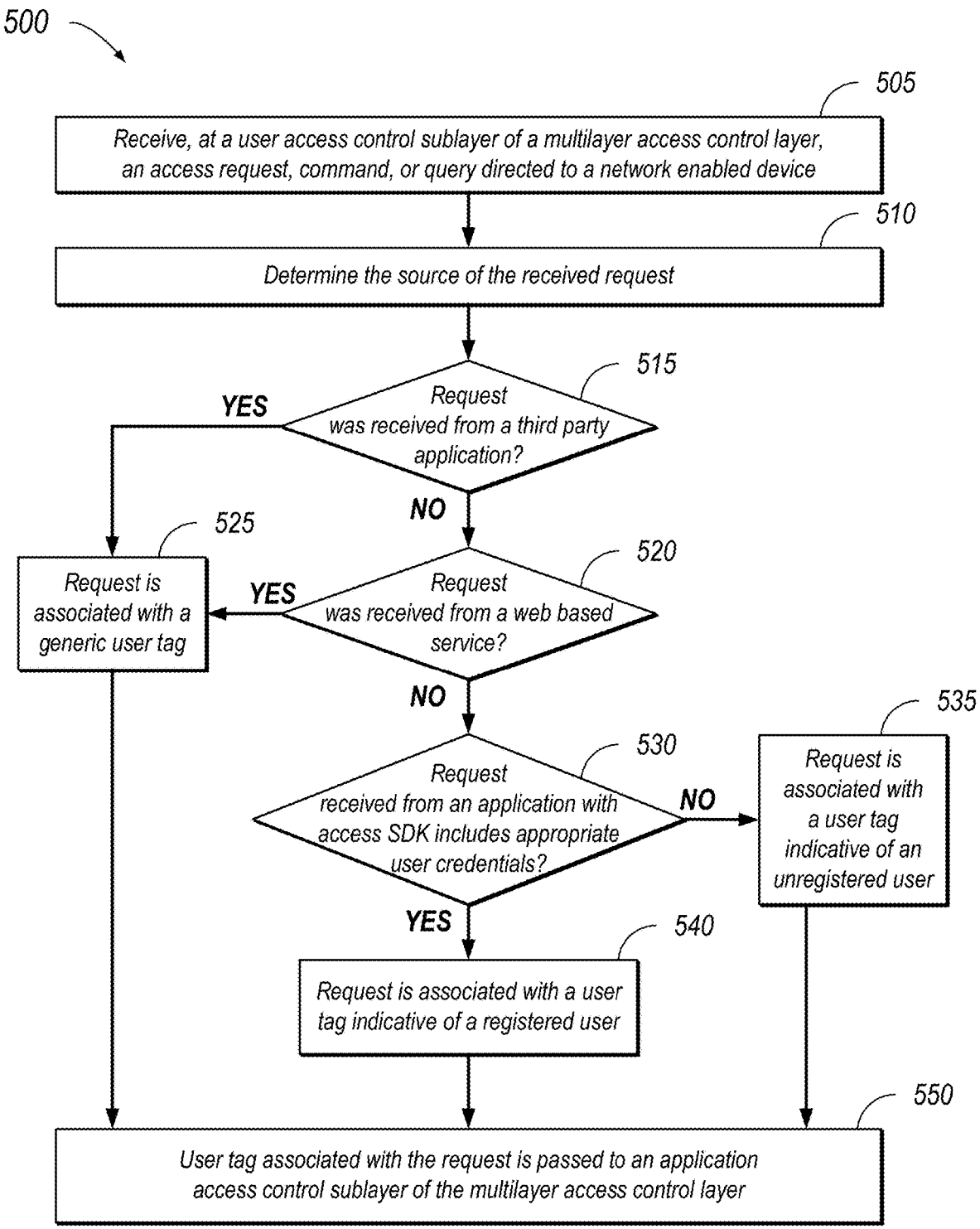
FIG. 5 is flow diagram illustrating a method for filtering accesses to connected devices by a user access control sublayer of a multilayer access control layer, according to at least some embodiments of the present disclosure.

As illustrated in this example, the multilayer access control layer 210 may include a user access control sublayer 215. In at least some embodiments, user access control sublayer 215 may implement a user access filter and may apply the filter to received access requests 205. In some embodiments, applying a user access filter to the received access requests 205 may include associating a respective user tag with at least some of the received access requests 205 indicating the results of the filtering by the user access filter. The operation of one embodiment of a user access control sublayer 215 is illustrated in FIG. 5 and described below.

Figure 6:
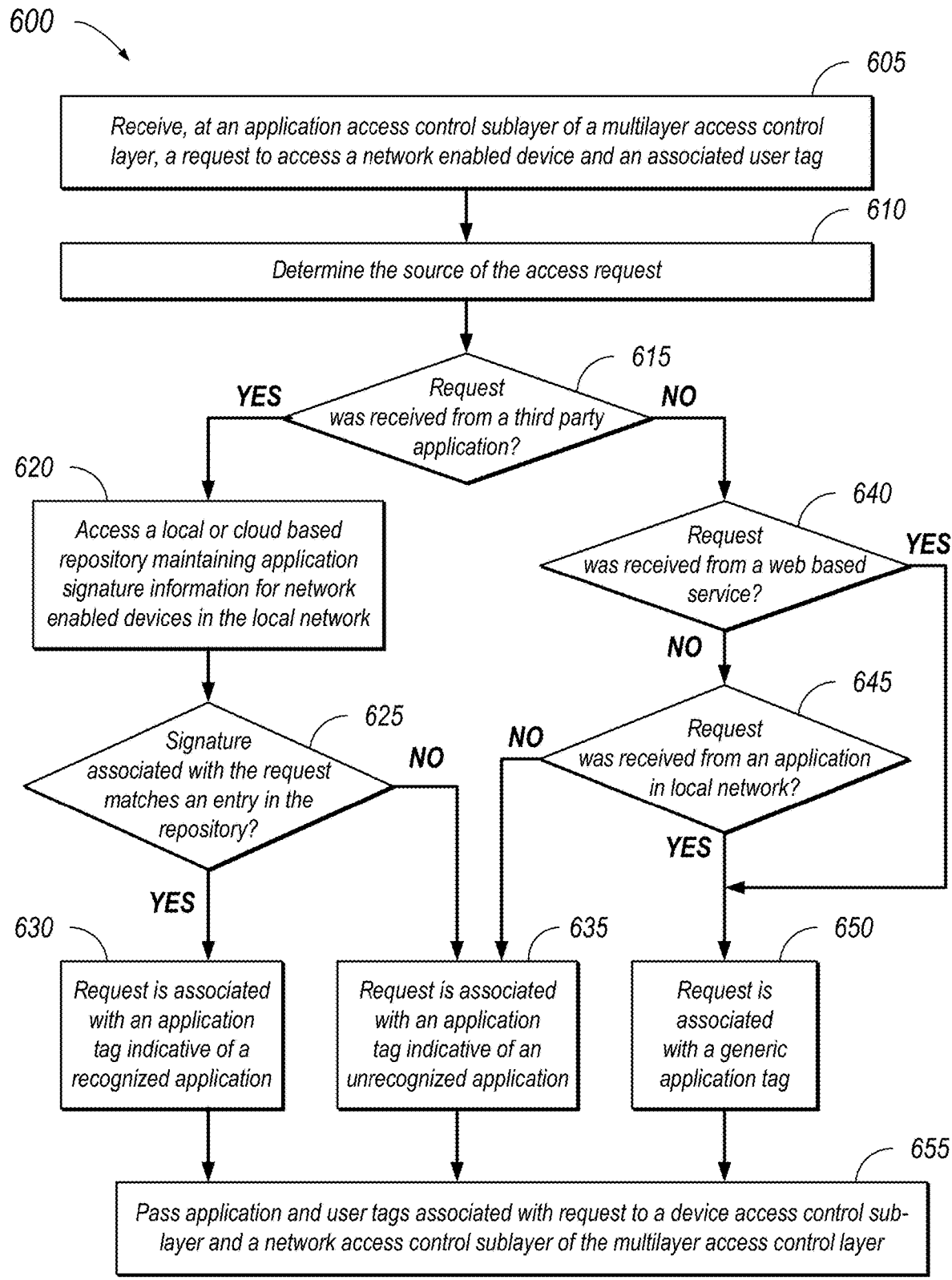
FIG. 6 is flow diagram illustrating a method for filtering accesses to connected devices by an application access control sublayer of a multilayer access control layer, according to at least some embodiments of the present disclosure.

As illustrated in FIG. 2, the multilayer access control layer 210 may include an application access control sublayer 225. In at least some embodiments, application access control sublayer 225 may implement an application access filter and may apply the filter to received access requests 205. In at least some embodiments, applying an application access filter to the received access requests 205 may include associating a respective application tag with at least some of the received access requests 205 indicating the results of the filtering by the application access filter. The operation of one embodiment of an application access control sublayer 225 is illustrated in FIG. 6 and described below.

Figure 8:
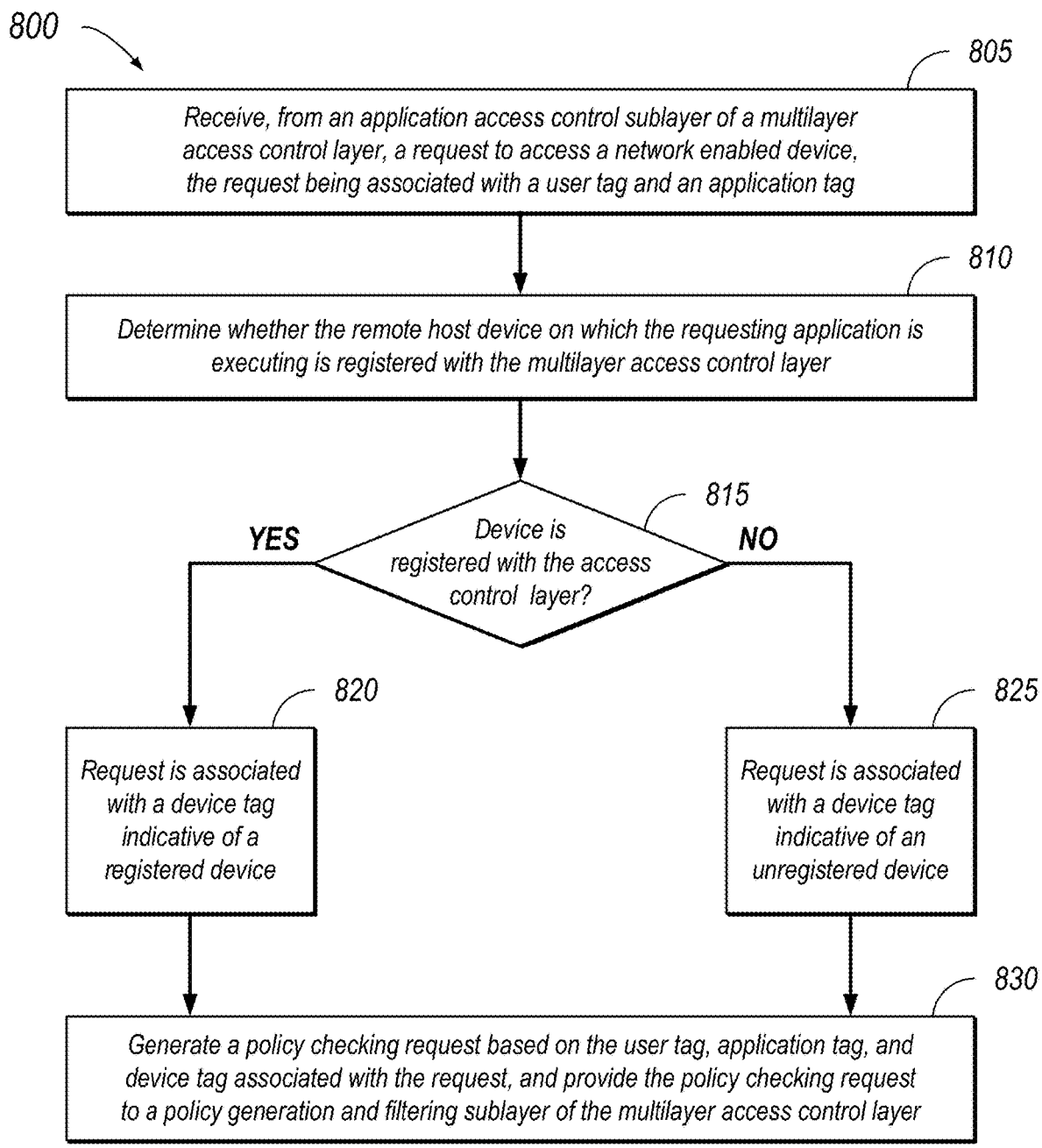
FIG. 8 is flow diagram illustrating a method for filtering accesses to connected devices by a device access control sublayer of a multilayer access control layer and generating a policy checking request for received access requests, according to at least some embodiments of the present disclosure.

As illustrated in FIG. 2, the multilayer access control layer 210 may include a device access control sublayer 235. In at least some embodiments, device access control sublayer 235 may implement a device access filter and may apply the filter to received access requests 205. In at least some embodiments, applying a device access filter to the received access requests 205 may include associating a respective device tag with at least some of the received access requests 205 indicating the results of the filtering by the device access filter. The operation of one embodiment of a device access control sublayer 235 is illustrated in FIG. 8 and described below.

Figure 7:
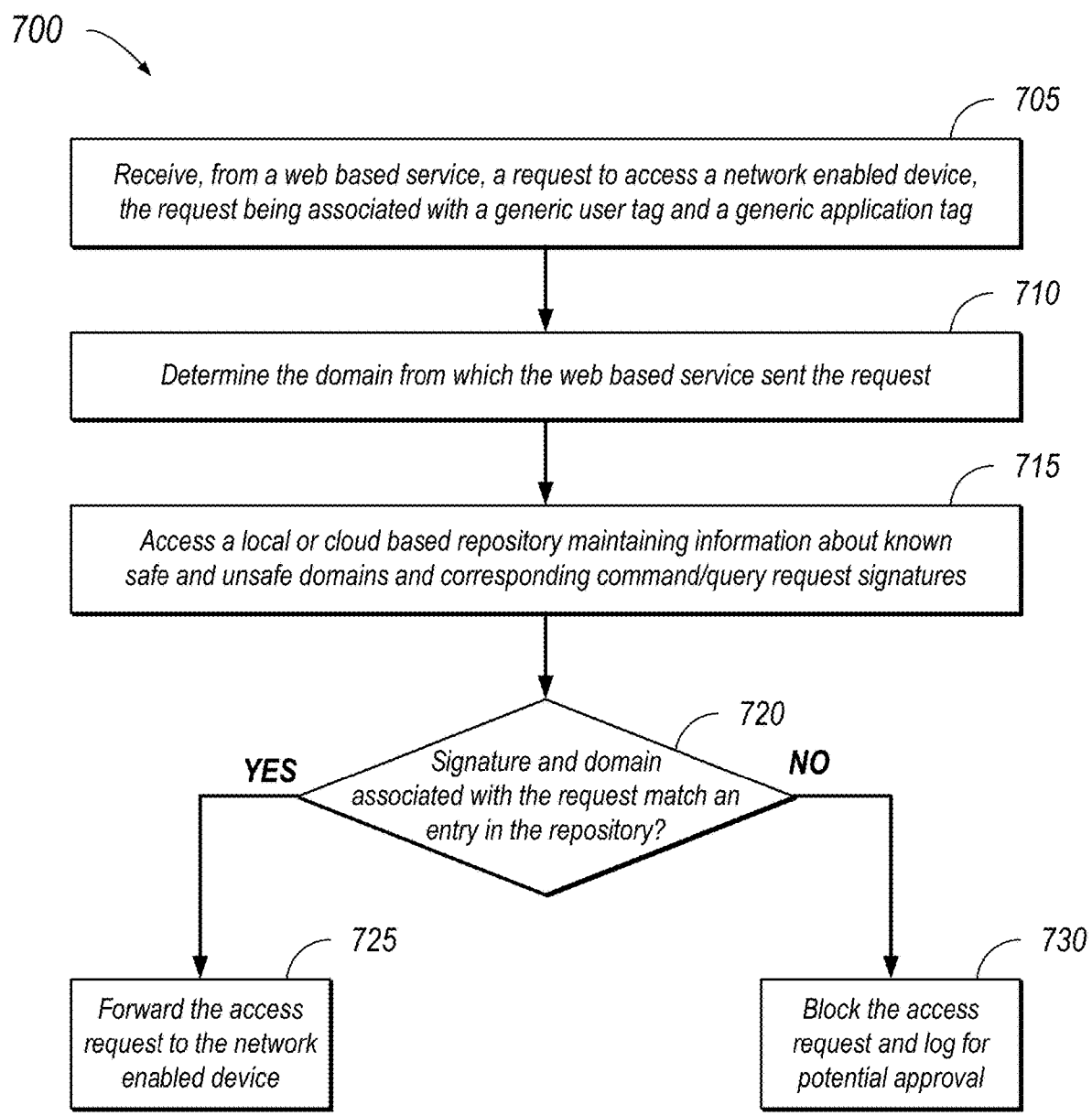
FIG. 7 is flow diagram illustrating a method for filtering accesses to connected devices by a network access control sublayer of a multilayer access control layer, according to at least some embodiments of the present disclosure.

As illustrated in FIG. 2, the multilayer access control layer 210 may include a network access control sublayer 220. In at least some embodiments, network access control sublayer 220 may implement a network access control filter for filtering received access requests 205 based on an Internet Protocol (IP)/Uniform Resource Locator (URL) of the respective network domain on which a web services are executing and from which various ones of the received access requests 205 are received. In at least some embodiments, applying a network access filter to a received access requests 205 may include determining whether the request was received from a remote host device on the same local area network (LAN) that includes the hub on which multilayer access control layer 210 resides and the IoT device that is the target of the request. The operation of one embodiment of a network access control sublayer 220 is illustrated in FIG. 7 and described below.

Figure 10:
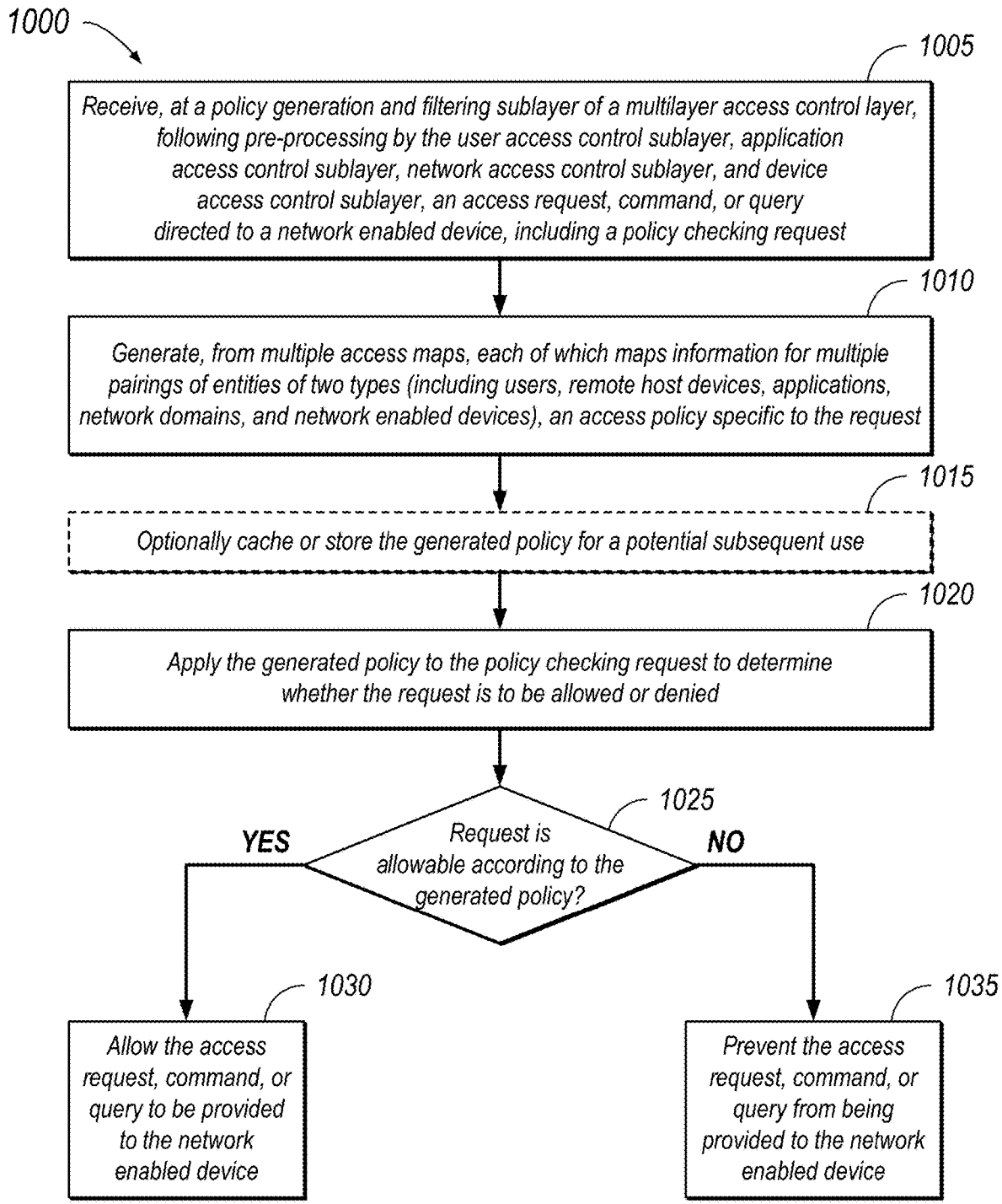
FIG. 10 is flow diagram illustrating a method for generating and applying an access policy that is specific to a received request to access a network enabled device, according to at least some embodiments of the present disclosure.

As illustrated in FIG. 2, the multilayer access control layer 210 may include a policy generation and filtering sublayer 240. In at least some embodiments, policy generation and filtering sublayer 240 may generate, for each of the received access requests 205, a respective access policy that is specific to that request. Policy generation and filtering sublayer 240 may then apply the generated access policy to the received access request 205 in accordance with any access control tags that were associated with the request by filters in other ones of the sublayers of the multilayer access control layer 210. In at least some embodiments, applying a generated access policy to a received access request 205 and its access control tags may include determining whether to allow the received access request 205 to be issued to the IoT device it targets as an allowed access request 245 or to deny, block, or otherwise prevent the received access request 205 being issued to the IoT device it targets. The operation of one embodiment of a policy generation and filtering sublayer 240 is illustrated in FIG. 10 and described below.

In various embodiments, each of sublayers 215, 220, 225, 225, 235, and 240, and their corresponding filters, may be implemented in any suitable manner, such as by a program, application, script, function, library, code, software, firmware, hardware, or other mechanisms for carrying out the functionality described herein. Moreover, each of these sublayers and corresponding filters may be arranged in any suitable hierarchy with respect to each other, with respect to connections to a network interface through which multilayer access control layer 210 is communicatively coupled to one or more IoT devices, or with respect to connections that communicatively couple multilayer access control layer 210 to a local area network or to the Internet.

As illustrated in FIG. 2, the multilayer access control layer 210 may include one or more access maps 230 that define the access rights of a variety of users, remote host devices, applications, commands, queries, web services, and/or network domains with respect to specific IoT devices. In some embodiments, access maps 230 may include multiple access maps, each of which stores access information for multiple pairings of entities of two entity types. In various embodiments, access maps 230 may be implemented in a memory, such as memory 120 illustrated in FIG. 1, using any suitable data structure, list, or file format. In one embodiment, the access maps 230 may be implemented as a hash map.

In at least some embodiments, the multilayer access control layer may control access permissions for all IoT devices connecting to the hub. The IoT devices, while perhaps having basic operating system stacks, might not themselves support user, controlling device, or service access authentication or permissions. In some embodiments, attempted accesses targeting the IoT devices of the hub by entities outside the local network may be filtered by the multilayer access control layer. In some embodiments, attempted access by entities in the local network of the IoT devices may be filtered by the multilayer access control layer. In at least some embodiments, each attempted access may be filtered by one or more components of the multilayer access control layer, such as a user access filter, a device access filter, an application access filter, or one or more network and/or service access filters. Each filter, alone or in combination with the other filters, may contribute to a determination of whether a given access attempt is allowed or denied. Consequently, the IoT devices that are the targets of these access attempts might respond only to users, devices, applications, or services that have appropriate privileges to access the device.

In at least some embodiment, multilayer access control layer 210 may manage operations of one or more IoT devices. In one embodiment, each of the IoT devices connecting to the hub on which multilayer access control layer 210 resides may be referenced and managed by the multilayer access control layer as objects. In another embodiment, the multilayer access control layer 210 may represent and handle other elements as objects, including users accessing the IoT devices, location information, notifications, delays, etc. In some embodiments, the interactions between IoT devices may be abstracted and represented in a form of language close to natural language.

In at least some embodiments, the sublayers of the multilayer access control layer may be interdependent. The multilayer access control layer may enforce access control for the IoT devices without modifying their software stack. The multilayer access control layer may be configured using an access software development kit (SDK) or application programming interface (API) that provides applications accessing the hub or the IoT devices the ability to control or configure the multilayer access control layer. Such controlling or configuring may be predicated upon having proper privileges or authentication.

In at least some embodiment, the remote host devices accessing the IoT devices may be registered by or added to the multilayer access control layer. Furthermore, users of the remote host devices on whose behalf access attempts are made may be registered by or added to the multilayer access control layer. Although the remote host devices from which access requests are received are designated as "remote", in some cases, they may be located on the same LAN, wireless local area network (WLAN), Intranet, or other network as the hub and the IoT devices.

Figure 3:
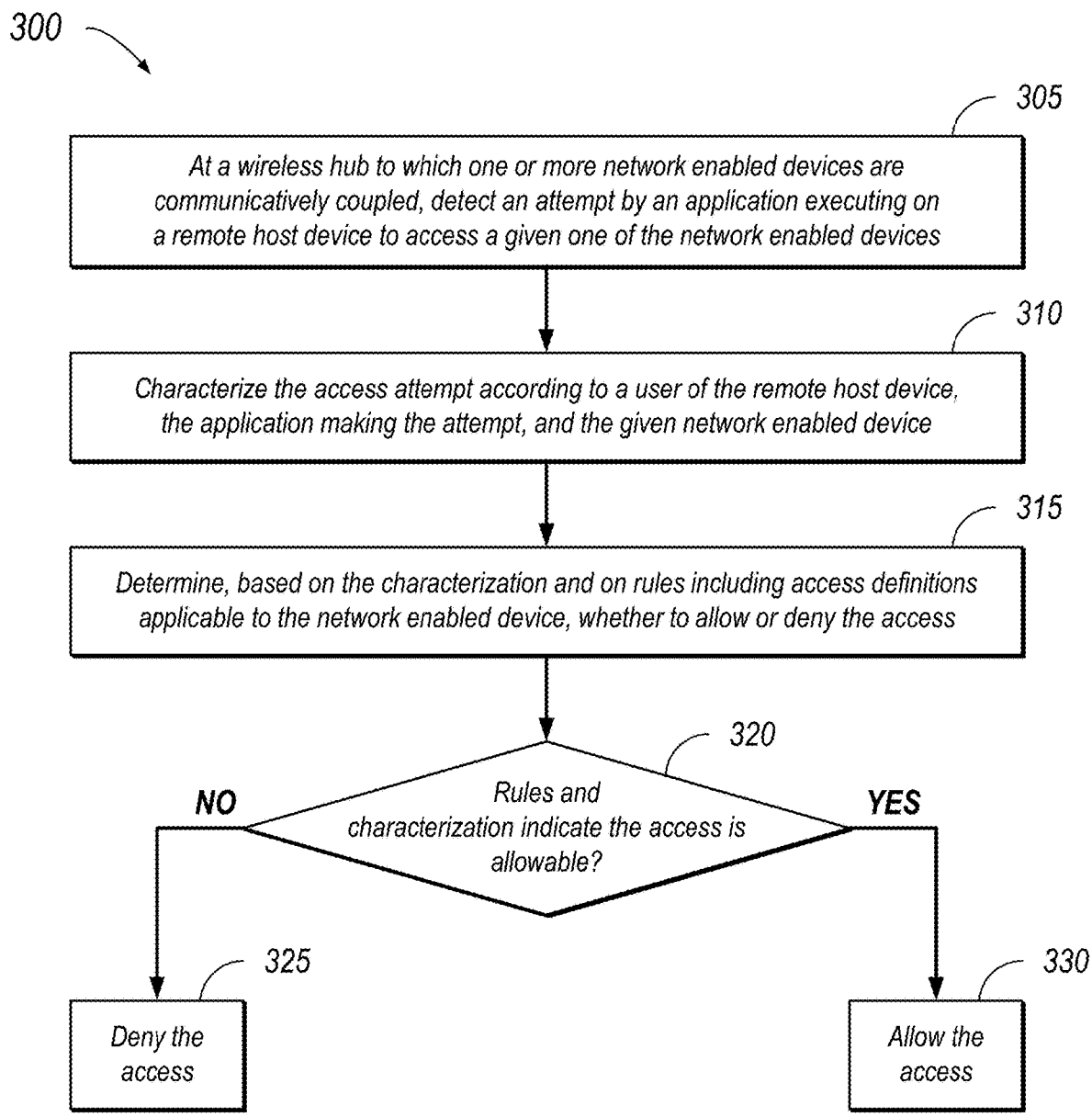
FIG. 3 is a flow diagram illustrating a method for controlling accesses to network enabled devices, according to at least some embodiments of the present disclosure.

FIG. 3 is a flow diagram illustrating a method 300 for controlling accesses to network enabled devices, according to at least some embodiments of the present disclosure. Method 300 may be implemented by any of the elements shown in FIGS. 1-2. Method 300 may be initiated by any suitable criteria and may initiate operation at any suitable point. In one embodiment, method 300 may initiate operation at 305. Method 300 may include greater or fewer operations than those illustrated. Moreover, method 300 may execute its operations in an order different than those illustrated below. Method 300 may terminate at any suitable operation. Moreover, method 300 may repeat operation at any suitable operation. Method 300 may perform any of its operations in parallel with other operations of method 300, or in parallel with operations of other methods. Furthermore, method 300 may be executed multiple times to determine whether to allow various received access requests to be issued to target network enabled devices or to deny the requests. Based upon the results of method 300, other methods may be invoked. In some embodiments, any of method 500 illustrated in FIG. 5, method 600 illustrated in FIG. 6, method 700 illustrated in FIG. 7, method 800 illustrated in FIG. 8, and/or method 1000 illustrated in FIG. 10 may be invoked during the execution of method 300 to perform some of the operations of method 300.

In this example embodiment, method 300 includes, at 305 detecting, at a wireless hub to which one or more network enabled devices are communicatively coupled, an attempt by an application executing on a remote host device to access a given one of the network enabled devices. The attempt may represent a command, a query, or another type of access request directed to the given network enabled device. In some embodiments, the given network enabled device may be an IoT device. Method 300 may also include, at 310, characterizing the access attempt according to a user of the remote host device, the application making the attempt, and the given network enabled device. For example, characterizing the access attempt may include applying multiple filters implemented by a multilayer access control layer to an access request received at the wireless hub.

In this example embodiment, method 300 may include, at 315, determining, based on the characterization and on rules that include definitions of access rights applicable to the network enabled device, whether to allow or deny the access. For example, the rules may include definitions of access rights, with respect to the network enabled device, for multiple users, applications, remote host devices, commands or queries, and/or network domains on which services executing applications attempting to access network enabled devices reside. If, at 320, it is determined that the characterization and rules indicate the access is allowable, method 300 may proceed to 330. Otherwise, method 300 may proceed to 325. At 330, the method may include allowing the access to the given network enabled device. Allowing the access may include issuing a received access request to the given network enabled device or otherwise allowing such a request to be issued to the given network enabled device. At 325, the method may include denying the access. Denying the access may include blocking a received access request or otherwise preventing such a request from being issued to the given network enabled device.

In various embodiments, method 300 may be implemented in any suitable manner on a wireless hub, such as by a program, application, script, function, library, code, software, firmware, hardware, or other mechanisms for carrying out the functionality described herein. In other embodiments, method 300 may be implemented in any suitable manner by another component of a system that controls accesses to network enabled devices, such as IoT devices.

In at least some embodiments, a multilayer access control layer may define different kinds of accesses that might be made from remote hosts that target various IoT devices, and may characterize received access requests according to these definitions. For example, the multilayer access control layer may define one or more of the following types of accesses, among others:

RDRU' attempts, in which a registered user (symbolized as RU') is attempting to access an IoT device using a registered host device (symbolized as RD);

RDUU' attempts, in which an unregistered user (symbolized as UU') is attempting to access an IoT device using a registered host device (symbolized as RD);

UDRU' attempts, in which a registered user (symbolized as RU') is attempting to access an IoT device using an unregistered host device (symbolized as UD);

UDUU' attempts, in which an unregistered user (symbolized as UU') is attempting to access an IoT device using an unregistered host device (symbolized as UD);

RDRA attempts, in which a recognized application (symbolized as RA) executing on a registered host device (symbolized as RD) is attempting to access an IoT device;

RDUA attempts, in which an unrecognized application (symbolized as UA) executing on a registered host device (symbolized as RD) is attempting to access an IoT device;

UDRA attempts, in which a recognized application (symbolized as RA) executing on an unregistered host device (symbolized as UD) is attempting to access an IoT device;

UDUA attempts, in which an unrecognized application (symbolized as UA) executing on an unregistered host device (symbolized as UD) is attempting to access an IoT device.

In at least some embodiments, following characterizing by a multilayer access control layer, one or more tags may be associated with each received request to access an IoT device. For example, a user tag may be associated with a received access request based on the application of a user access control filter of the multilayer access control layer, where the value of the tag indicates a result of the filtering. In another example, an application tag may be associated with a received access request based on the application of an application access control filter of the multilayer access control layer, where the value of the tag indicates a result of the filtering. In yet another example, a device tag may be associated with a received access request based on the application of a device access control filter of the multilayer access control layer, where the value of the tag indicates a result of the filtering. These tags may, collectively, represent the specific access type of the request.

In one embodiment, the user access control sublayer may be a pre-process layer. Any command or query received from a remote host device and directed to an IoT device may first have to pass this sublayer before being filtered by other sublayers of the multilayer access control layer. The user access control sublayer may attach tags to, or associate tags with, the command or query based upon stored policy rules, as discussed in more detail below. In some embodiments, these may be associated with the commands or queries by the SDK being used by the application from which they are received. The tagged command or query may then be forwarded to a next sublayer of the multilayer access control layer. In some embodiments, each query or command may pass through the user access control sublayer without being blocked. The associated tags may be provided, along with the command or query, to the next sublayer, which may further process the command or query.

Figure 4:
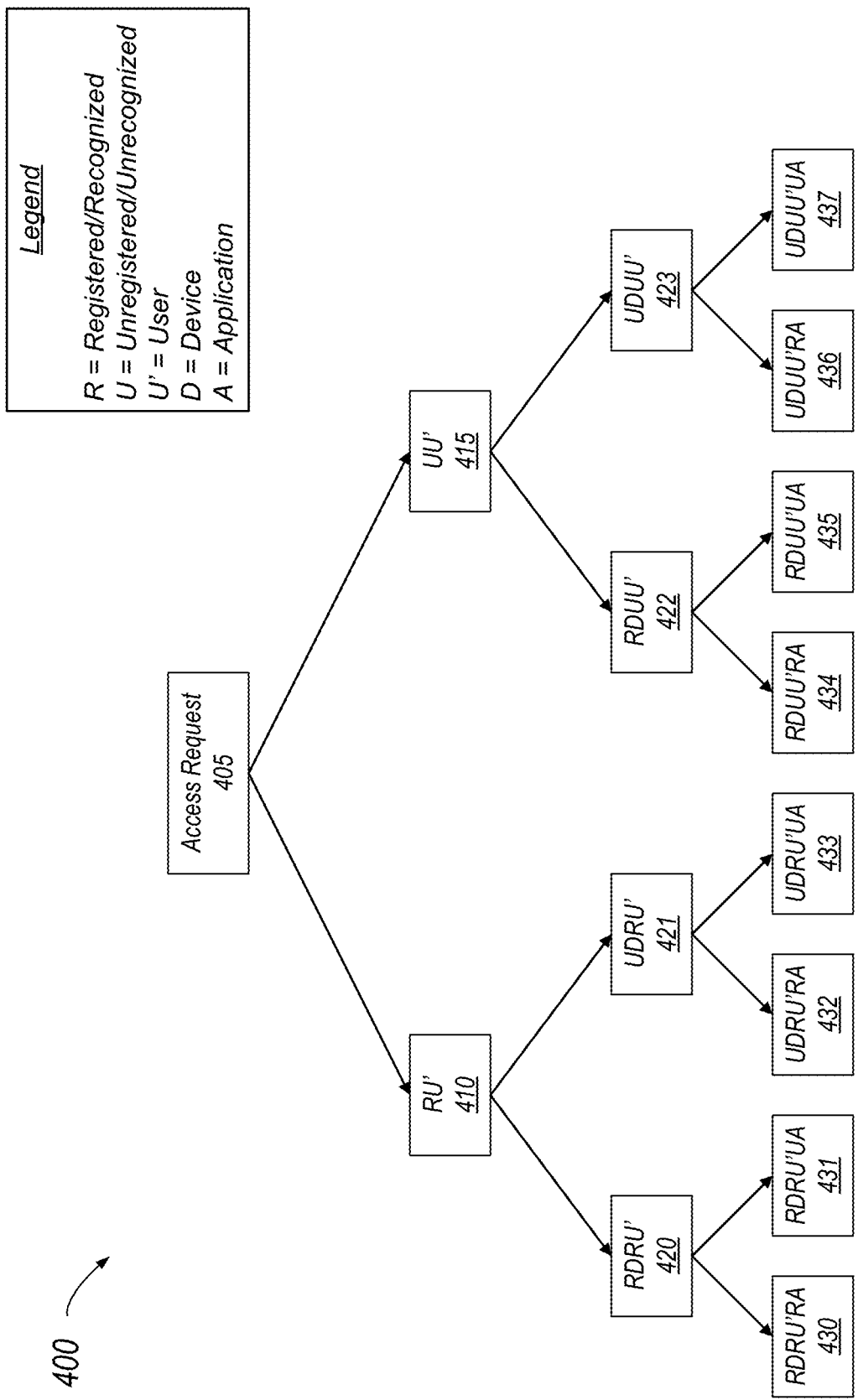
FIG. 4 illustrates a graphic representation of the association of tags with an access request by different sublayers of a multilayer access control layer, according to at least some embodiments of the present disclosure.

FIG. 4 illustrates a graphic representation 400 of the association of tags with an access request by different sublayers of a multilayer access control layer, according to at least some embodiments of the present disclosure. In this example, as an access request 405 passes through the user access control sublayer, the device access control sublayer, and the application access control sublayer of a multilayer access control layer, one of multiple tags may be associated with the access request 405 at each sublayer. As in the example access type definitions above, the tags that can be associated with the command or query by the user access control sublayer may include, for example, designations of whether the command or query was received from, or on behalf of, a registered user (RU') or from an unregistered user (UU'). In some embodiments, a tag associated with an access request 405 by the user access control sublayer may designate that the notion of the "user" is not applicable to the determination of whether to allow or deny the given query or command (NA). This option for the user tag is not illustrated in FIG. 4.

In the example illustrated in FIG. 4, the tags that are associated with the command or query by the device access control sublayer may include, for example, designations of whether the command or query was received from a registered device (RD) or from an unregistered device (UD). In some embodiments, a tag associated with an access request 405 by the device access control sublayer may designate that the notion of the "device" is not applicable to the determination of whether to allow or deny the given query or command (NA). This option for the device tag is not illustrated in FIG. 4. The tags that are associated with the command or query by the application access control sublayer may include, for example, designations of whether the application is recognized by the multilayer access control layer as being a safe application (RA), or is an unrecognized application or is known to be an unsafe application (UA). In some embodiments, a tag associated with an access request 405 by the application access control sublayer may designate that the notion of the "application" is not applicable to the determination of whether to allow or deny the given query or command (NA). This option for the device tag is not illustrated in FIG. 4.

In FIG. 4, a given access request 405, as is passes through the user access control sublayer, the device access control sublayer, and the application access control sublayer of a multilayer access control layer, an additional tag may be associated with the access request. For example, tag 410, which may be associated with the access request 405 by the user access control sublayer, indicates that the request was received from, or on behalf of, a registered user. Alternatively, tag 415 indicates that the request was received from, or on behalf of, an unregistered user.

Tag 420, which includes tag 410 and an additional tag that is associated with the access request 405 by the device access control sublayer, indicates that the request was received from, or on behalf of, a registered user from a registered device. Tag 421, which includes tag 410 and an additional tag that is associated with the access request 405 by the device access control sublayer, indicates that the request was received from, or on behalf of, a registered user from an unregistered device. Tag 422, which includes tag 415 and an additional tag that is associated with the access request 405 by the device access control sublayer, indicates that the request was received from, or on behalf of, an unregistered user from a registered device. Tag 423, which includes tag 415 and an additional tag that is associated with the access request 405 by the device access control sublayer, indicates that the request was received from, or on behalf of, an unregistered user from an unregistered device.

Tag 430, which includes tag 420 and an additional tag that is associated with the access request 405 by the application access control sublayer, indicates that the request was received from, or on behalf of, a registered user using a recognized application executing on a registered device. Tag 431, which includes tag 420 and an additional tag that is associated with the access request 405 by the application access control sublayer, indicates that the request was received from, or on behalf of, a registered user using an unrecognized application executing on a registered device. Tag 432, which includes tag 421 and an additional tag that is associated with the access request 405 by the application access control sublayer, indicates that the request was received from, or on behalf of, a registered user using a recognized application executing on an unregistered device. Tag 433, which includes tag 421 and an additional tag that is associated with the access request 405 by the application access control sublayer, indicates that the request was received from, or on behalf of, a registered user using an unrecognized application executing on an unregistered device.

Tag 434, which includes tag 422 and an additional tag that is associated with the access request 405 by the application access control sublayer, indicates that the request was received from, or on behalf of, an unregistered user using a recognized application executing on a registered device. Tag 435, which includes tag 422 and an additional tag that is associated with the access request 405 by the application access control sublayer, indicates that the request was received from, or on behalf of, an unregistered user using an unrecognized application executing on a registered device. Tag 436, which includes tag 423 and an additional tag that is associated with the access request 405 by the application access control sublayer, indicates that the request was received from, or on behalf of, an unregistered user using a recognized application executing on an unregistered device. Tag 437, which includes tag 423 and an additional tag that is associated with the access request 405 by the application access control sublayer, indicates that the request was received from, or on behalf of, an unregistered user using an unrecognized application executing on an unregistered device.

FIG. 5 is flow diagram illustrating a method 500 for filtering accesses to connected devices by a user access control sublayer of a multilayer access control layer, according to at least some embodiments of the present disclosure. In various embodiments, method 500 may be executed by the user access control sublayer to evaluate a command, a query, or another type of access request that targets a network enabled device, such as an IoT device, and that arrives at the multilayer access control layer of hub to which the target device is communicatively coupled. Method 500 may be implemented by any of the elements shown in FIGS. 1-2. Method 500 may be initiated by any suitable criteria and may initiate operation at any suitable point. In one embodiment, method 500 may initiate operation at 505. Method 500 may include greater or fewer operations than those illustrated. Moreover, method 500 may execute its operations in an order different than those illustrated below. Method 500 may terminate at any suitable operation. Moreover, method 500 may repeat operation at any suitable operation. Method 500 may perform any of its operations in parallel with other operations of method 500, or in parallel with operations of other methods. Furthermore, method 500 may be executed multiple times to apply a user access control filter to various received access requests. Based upon the results of method 500, other methods may be invoked. In some embodiments, method 500 may be invoked during the execution of method 300 to perform some of the operations of method 300.

In the example embodiment illustrated in FIG. 5, method 500 includes, at 505, receiving, at a user access control sublayer of a multilayer access control layer, an access request, command, or query directed to a network enabled device. At 510, the method includes determining the source of the received request. For example, in some embodiments, it may be determined whether the request was made by a third party application, by a web based service, or by an application using a known API or SDK to access the network enabled devices through the hub according to the protocols defined by the multilayer access control layer.

If at 515, it is determined that the request was made by a third party, method 500 may proceed to 525. Similarly, if at 520, it is determined that request was received from a web based service, method 500 may proceed to 525. At 525, the request is associated with a generic user tag. For example, in some embodiments, if a query or command arises from a remote host outside of a defined network boundary, such that the remote host is not considered part of the same network as the hub, a user tag of NA may be associated with the request. This may arise, for example, from web services issuing commands or queries over the Internet.

In at least some embodiments of the present disclosure, the queries and commands received from applications executing on remote hosts may be filtered and provided a tag of RU if the application presents proper credentials authenticating the user and the user's registration with the hub. If, at 530, it is determined that a request received from an application with an access SDK that includes appropriate user credentials, the request is associated with a user tag indicative of a registered user, as in 540. In some embodiments, the RU tag may contain a unique user-ID of the respective user.

If, at 530, a request received from an application with an access SDK does not include appropriate user credentials, the request is associated with a user tag indicative of an unregistered user, as in 535. For example, in some embodiments, the queries and commands received from applications in remote hosts may be provided an application tag of UU if the application fails to present such proper credentials. In this example, at 550, method 500 includes passing the user tag associated with the request to an application access control sublayer of the multilayer access control layer.

In various embodiments, method 500 may be implemented in any suitable manner on a wireless hub, such as by a program, application, script, function, library, code, software, firmware, hardware, or other mechanisms for carrying out the functionality described herein. In other embodiments, method 500 may be implemented in any suitable manner by another component of a system that controls accesses to network enabled devices, such as IoT devices.

In at least some embodiments, the application access control sublayer is a sublayer that filters each command or query based on whether or not the command or query is received from a recognized and approved application. In some embodiments, this recognition may be achieved via the access SDK. For example, the access SDK may perform the preliminary handshake with the multilayer access control layer when the command or query is received. Thus, it may determine whether or not the access request is received from a registered application. In some embodiments, the function of the application access control sublayer may be not only to allow access attempts made by recognized applications and block access attempts made by unrecognized applications, but also to allow recognized commands and queries and to block unrecognized commands and queries, thus protecting IoT devices from applications that can violate the protocols of the IoT devices or otherwise harm the IoT devices. In some cases, because the number of devices in a home is relatively limited and because each device supports a standard set of commands and parameter boundaries, the signature hashes for the allowed commands and queries for each of these devices may be relatively easy to generate and maintain, either locally (e.g., on the hub) or by a web based service.

FIG. 6 is flow diagram illustrating a method 600 for filtering accesses to connected devices by an application access control sublayer of a multilayer access control layer, according to at least some embodiments of the present disclosure. In some embodiments, the application access control sublayer may filter requests based upon whether the inbound request is from a recognized or approved application. In various embodiments, method 600 may be executed by the application access control sublayer to evaluate a command, a query, or another type of access request that targets a network enabled device, such as an IoT device, and that arrives at the multilayer access control layer of hub to which the target device is communicatively coupled. Method 600 may be implemented by any of the elements shown in FIGS. 1-2. Method 600 may be initiated by any suitable criteria and may initiate operation at any suitable point. In one embodiment, method 600 may initiate operation at 605. Method 600 may include greater or fewer operations than those illustrated. Moreover, method 600 may execute its operations in an order different than those illustrated below. Method 600 may terminate at any suitable operation. Moreover, method 600 may repeat operation at any suitable operation. Method 600 may perform any of its operations in parallel with other operations of method 600, or in parallel with operations of other methods. Furthermore, method 600 may be executed multiple times to apply an application access control filter to various received access requests. Based upon the results of method 600, other methods may be invoked. In some embodiments, method 600 may be invoked during the execution of method 300 to perform some of the operations of method 300.

In the example embodiment illustrated in FIG. 6, method 600 includes at 605, receiving, at an application access control sublayer of a multilayer access control layer, a request to access a network enabled device and an associated user tag. In at least some embodiments, the application access control sublayer may receive the request from a user access control sublayer of the multilayer access control layer, as described above. The request may represent a command, a query, or another type of access request directed to the network enabled device. In this example, method 600 may include, at 610, determining the source of the access request.

If, at 615, it is determined that the request was received from a third party application, method 600 proceeds to 620. Otherwise, method 600 proceeds to 640. The signature of the application may be checked against the library or database. For example, at 620, method 600 may include accessing a cloud based repository that maintains application signature information for network enabled devices in the local network. In this example, a cloud service, reputation server, or knowledge base may be maintained or otherwise be accessible by the multilayer access control layer. Such a service may store information defining whether a given application is known to be safe or is known to be malicious. The applications may be identified or defined according a digital signature or hash. The check may be based upon an application signature library. The application access control sublayer may synchronize with this service to determine whether the application issuing the request is an application known to be safe or is unknown. In some embodiments, the application signature library, or copy of a portion thereof, may be stored in the home network. In some embodiments, the repository maintaining application signature information may also maintain signature information for specific commands or query requests.

If, at 625, it is determined that the signature associated with the request matches an entry in the repository, the request is associated with an application tag indicative of a recognized application, as in 630. Otherwise, the request is associated with an application tag indicative of an unrecognized application, as in 635. For example, in one embodiment, if the application is known to be safe, then a tag for a recognized application (RA) may be associated with the query or command. The RA tag may contain the signature or another unique identifier for the application. In some embodiments, the RA tag may also include a parameter indicating whether or not the specific command or query represented by the access request is acceptable for issuance to the target device. If the application is known to be malicious, the query or command may be discarded. In another embodiment, if the application is unknown, then a tag for an unrecognized application (UA) may be associated with the query or command. In some embodiments, the UA tag may contain a generic application identifier. In some embodiments, the UA tag may include a parameter indicating whether or not the specific command or query represented by the access request is acceptable for issuance to the target device.

If, at 615, it is determined that the request was not received from a third party application and if, at 640, it is determined that the request was received from a web based service, method 600 proceeds to 650, where the request is associated with a generic application tag. A generic application tag, such as NA, may indicate that the application is not considered when determining whether the request is allowed or denied. For example, the application may not be considered if it is received from an application executing within the same local area network (LAN) that includes the hub on which the multilayer access control layer resides and the network enabled device that is the target of the request. Thus, at 615, if it is determined that the request was not received from a third party application and if, at 645, it is determined that the request was received from an application within the local network, method 600 proceeds to 650, where the request is associated with a generic application tag. In this example embodiment, if the request is from a registered user within the local network (e.g., a home network), an unregistered user within the home network, or from a web service, then the request may be passed to the next layer, maintaining the existing tags, including those associated with the request by the user access control sublayer. In other embodiments, if, at 615, it is determined that a request was not received from a third party application and if, at 645, it is determined that the request was received from an application within the local network, the request may be associated with an application tag indicative of a recognized application, rather than with a generic application tag.

In this example, if at 615, it is determined that the request was not received from a third party application, if, at 640, it is determined that the request was not received from a web based service, and if, at 645, it is determined that the request was received from an application within local network, the request is associated with an application tag indicative of an unrecognized application, as in 635. After determining whether to associate an application tag with the request, method 600 may include, at 655, passing any application and user tags associated with the request to a device access control sublayer and/or to a network access control sublayer of the multilayer access control layer. For example, in some embodiments, the access requests that pass, and are released from, the application access control sublayer may be checked for tags. If an access request includes an application tag of NA, this indicates that the access request was received from a web service. In this case, the request may be forwarded to the network access control sublayer. Access requests that are tagged with other tags (e.g., RA, UA, RU, or UU tags) may be forwarded to the device access control sublayer.

In various embodiments, method 600 may be implemented in any suitable manner on a wireless hub, such as by a program, application, script, function, library, code, software, firmware, hardware, or other mechanisms for carrying out the functionality described herein. In other embodiments, method 600 may be implemented in any suitable manner by another component of a system that controls accesses to network enabled devices, such as IoT devices.

In some embodiments, a determination of whether an application is recognized or unrecognized may be further based upon the specific command or query that is made. For example, some commands or queries may be compatible with, or known to be safe for, a given IoT device or IoT device type. The known or safe commands or queries may be identified through unique hashes, signatures, or other identifiers. In some embodiments, a repository that maintains application signature information may also maintain signature information for specific commands and queries, and other types of access requests.

In some embodiments, a determination of whether an application is recognized or unrecognized may be made on an IoT-device-by-IoT-device basis. For example, a given type or model of IoT device may be configured to work with specific applications, or with specific instructions (e.g., commands or queries) from specific applications. The application access control sublayer may determine whether both the application and the command or query is known to work safely with the given IoT device model or type. If the application is not known to work safely with the IoT device, based upon signature matching, then the UA tag may be associated with the query or command. If the application command or query is not known to work safely with the IoT device, based upon signature matching, then the UA tag may be associated with the query or command. If both the application command or query and the application are known to work safely with the IoT device, then the RA tag may be associated with the command or query. Similarly, checking may be made upon particular instances of a type of IoT device, where an application command or query and the application are checked against known histories of accesses of the specific IoT device instance.

FIG. 7 is flow diagram illustrating a method 700 for filtering accesses to connected devices by a network access control sublayer of a multilayer access control layer, according to at least some embodiments of the present disclosure. Method 700 may apply filtering by a network access control sublayer for an access request that targets a network enabled device, such as an IoT device. In one embodiment, the network access control sublayer may determine whether the access request is from a genuine service or whether it may contain malicious content. In various embodiments, method 700 may be executed by the network access control sublayer to evaluate a command, a query, or another type of access request that targets a network enabled device, such as an IoT device, and that arrives at the multilayer access control layer of hub to which the target device is communicatively coupled. Method 700 may be implemented by any of the elements shown in FIGS. 1-2. Method 700 may be initiated by any suitable criteria and may initiate operation at any suitable point. In one embodiment, method 700 may initiate operation at 705. Method 700 may include greater or fewer operations than those illustrated. Moreover, method 700 may execute its operations in an order different than those illustrated below. Method 700 may terminate at any suitable operation. Moreover, method 700 may repeat operation at any suitable operation. Method 700 may perform any of its operations in parallel with other operations of method 700, or in parallel with operations of other methods. Furthermore, method 700 may be executed multiple times to evaluate various received access requests. Based upon the results of method 700, other methods may be invoked. In some embodiments, method 700 may be invoked during the execution of method 300 to perform some of the operations of method 300.

In this example embodiment, method 700 includes, at 705, receiving, from a web based service, a request to access a network enabled device. The request is associated with a generic user tag and a generic application tag, as described above, these tags having been associated with the request by the user access control sublayer and the application access control sublayer of a multilayer access control layer, respectively. The request may represent a command, a query, or another type of access request directed to the device. In one embodiment, the network access control sublayer may receive its input from the application access control sublayer. In various embodiments, the network access control sublayer may operate on a network layer of the hub on which the multilayer access control layer executes.

In this example, at 710, method 700 includes determining the domain from which the web based service sent the request. For example, the network access control sublayer may perform a reverse domain name service request or a similar operation to find the domain from the request was sent. In some cases, multiple chains of requests may be tracked to identify the domain from which the request was sent. At 715, the method may include accessing a local or cloud based repository that maintains information about known safe and unsafe network domains, including those that are approved for use and those that are known or suspected to be malicious, and corresponding command/query request signatures. For example, once the requesting domain is identified, an identifier of the domain may be looked up in a suitable cloud reputation service, local synchronized copy thereof, or database to identify whether the domain is known to be safe, unknown, or malicious. In one embodiment, each type of network enabled device may be defined according to what domains are safe to access the type of network enabled device. In another embodiment, each type of network enabled device may be defined according to what commands, queries, or other types of access requests from various domains, either generally or from specific domains, are safe to issue to the network enabled device. In some embodiment, the particular commands, queries, or other access requests that are safe to issue to the network enabled device may be uniquely identified by a hash or signature.

If, at 720, the signature and domain associated with the request match an entry in the repository, the access request is forwarded to the network enabled device, as in 725. For example, if the domain and its command, query, or other access request matches a known, safe record, then the command, query, or other access request may be issued to the target network enabled device, or may be allowed to be issued to the target network enabled device. If, at 720, the signature and domain associated with the request do not match an entry in the repository, the access request may be blocked and logged for potential approval, as in 730. For example, if the domain and its command, query, or other access request do not match a known, safe record, the command, query, or other access request may be denied and logged. Subsequently, an administrator of the hub may approve the source of the request, the web service, or the command, query, or other access request. In some embodiments, if the source of the request, the web service, or the command, query, or other access request is approved by an administrator of the hub, the signature information maintained in the local or cloud based repository may be updated to indicate that the source of the request, the web service, or the command, query, or other access request is known to be safe. Subsequently received requests that include the same source of the request, the same web service, and/or the same command, query, or other access request might be allowed.

In various embodiments, method 700 may be implemented in any suitable manner on a wireless hub, such as by a program, application, script, function, library, code, software, firmware, hardware, or other mechanisms for carrying out the functionality described herein. In other embodiments, method 700 may be implemented in any suitable manner by another component of a system that controls accesses to network enabled devices, such as IoT devices.

As previously noted, in some embodiments, all of the access requests that are tagged as RU, UU, RA, and/or UA by the user access control sublayer and the application access control sublayer may be passed to the device access control sublayer of the multilayer access control layer. This may be the last pre-processing sublayer through which access requests pass before they are, potentially, forwarded to the policy generation and filtering sublayer. This device access control sublayer may add the final tags to the access request that are passed to it, including the RD and UD tags described above. In at least some embodiments, remote host devices that are registered devices may be recognized by a unique device-ID. The device-ID may be derived based on the MAC addresses of the remote host devices and/or on other device parameters. This device-ID may be shared by the applications or SDKs that are executing on the remote host devices and from which access requests are received and the hub according to an applicable handshake protocol.

FIG. 8 is flow diagram illustrating a method 800 for filtering accesses to connected devices by a device access control sublayer of a multilayer access control layer and generating a policy checking request for received access requests, according to at least some embodiments of the present disclosure. In various embodiments, method 800 may be executed by the device access control sublayer to evaluate a command, a query, or another type of access request that targets a network enabled device, such as an IoT device, and that arrives at the multilayer access control layer of hub to which the target device is communicatively coupled. Method 800 may be implemented by any of the elements shown in FIGS. 1-2. Method 800 may be initiated by any suitable criteria and may initiate operation at any suitable point. In one embodiment, method 800 may initiate operation at 805. Method 800 may include greater or fewer operations than those illustrated. Moreover, method 800 may execute its operations in an order different than those illustrated below. Method 800 may terminate at any suitable operation. Moreover, method 800 may repeat operation at any suitable operation. Method 800 may perform any of its operations in parallel with other operations of method 800, or in parallel with operations of other methods. Furthermore, method 800 may be executed multiple times to apply a device access control filter to various received access requests. Based upon the results of method 800, other methods may be invoked. In some embodiments, method 800 may be invoked during the execution of method 300 to perform some of the operations of method 300.

In this example, method 800 includes, at 805, receiving, from an application access control sublayer of a multilayer access control layer, a request to access a network enabled device. The request may represent a command, a query, or another type of access request directed to the network enabled device. In one embodiment, the device access control sublayer may receive its input from the application access control sublayer, as described above. The request may be associated with a user tag and an application tag, the tags having been associated with the request by the user access control sublayer and the application access control layer, respectively. For example, the received input may include queries or commands tagged as RU, UU, RA, and/or UA. The device access control sublayer may perform functions similar to the user access control sublayer, but may instead apply device checking rather than user checking to the received requests.

In the example embodiment illustrated in FIG. 8, method 800 includes, at 810, determining whether the remote host device on which the requesting application is executing is registered with the multilayer access control layer. If, at 815, it is determined that the remote host device is registered with the multilayer access control layer, method 800 proceeds to 820, where the request is associated with a device tag indicative of a registered device. Otherwise, method 800 proceeds to 825, where the request is associated with a device tag indicative of an unregistered device. For example, in one embodiment, the device access control sublayer may add device tags of "RD" and "UD" for registered host devices and unregistered host devices, respectively. In at least some embodiments, the RD tag may include a unique device identifier of the remote host device that is attempting to access the network enabled device. In some embodiments, the RD and UD tags may be joined to the tags that were previously associated with the request.

At 830, method 800 may include generating a policy checking request based on the user tag, application tag, and device tag associated with the request, and providing the policy checking request to a policy generation and filtering sublayer of the multilayer access control layer. For example, in one embodiment, a hash may be generated according to the tags, and this hash may be provided to a policy generation and filtering sublayer of the multilayer access control layer to determine which user, device, and applications should have control or access rights with respect to a given network enabled device. If the mapping policies allow a given combination of user, device, and applications for the target device, then the command, query, or other access request may be forwarded to the target device. For example, the command, query, or other access request may be issued to the target network enabled device, or may be allowed to be issued to the target network enabled device. Otherwise, the command, query, or other access request may be blocked, paused, logged, or passed on to a user or administrator who might have authority to approve and allow the combination.

In various embodiments, method 800 may be implemented in any suitable manner on a wireless hub, such as by a program, application, script, function, library, code, software, firmware, hardware, or other mechanisms for carrying out the functionality described herein. In other embodiments, method 800 may be implemented in any suitable manner by another component of a system that controls accesses to network enabled devices, such as IoT devices.

As illustrated in the figures and described herein, the four sublayers of the multilayer access control layer may act as a preprocessing stage to generate tags for the commands and queries. The tags may be passed to a policy control block of the multilayer access control layer. Such a policy control block may contain any suitable number and kind of mappings and policies by which the request or command may be allowed or blocked as described above.

Figure 9:
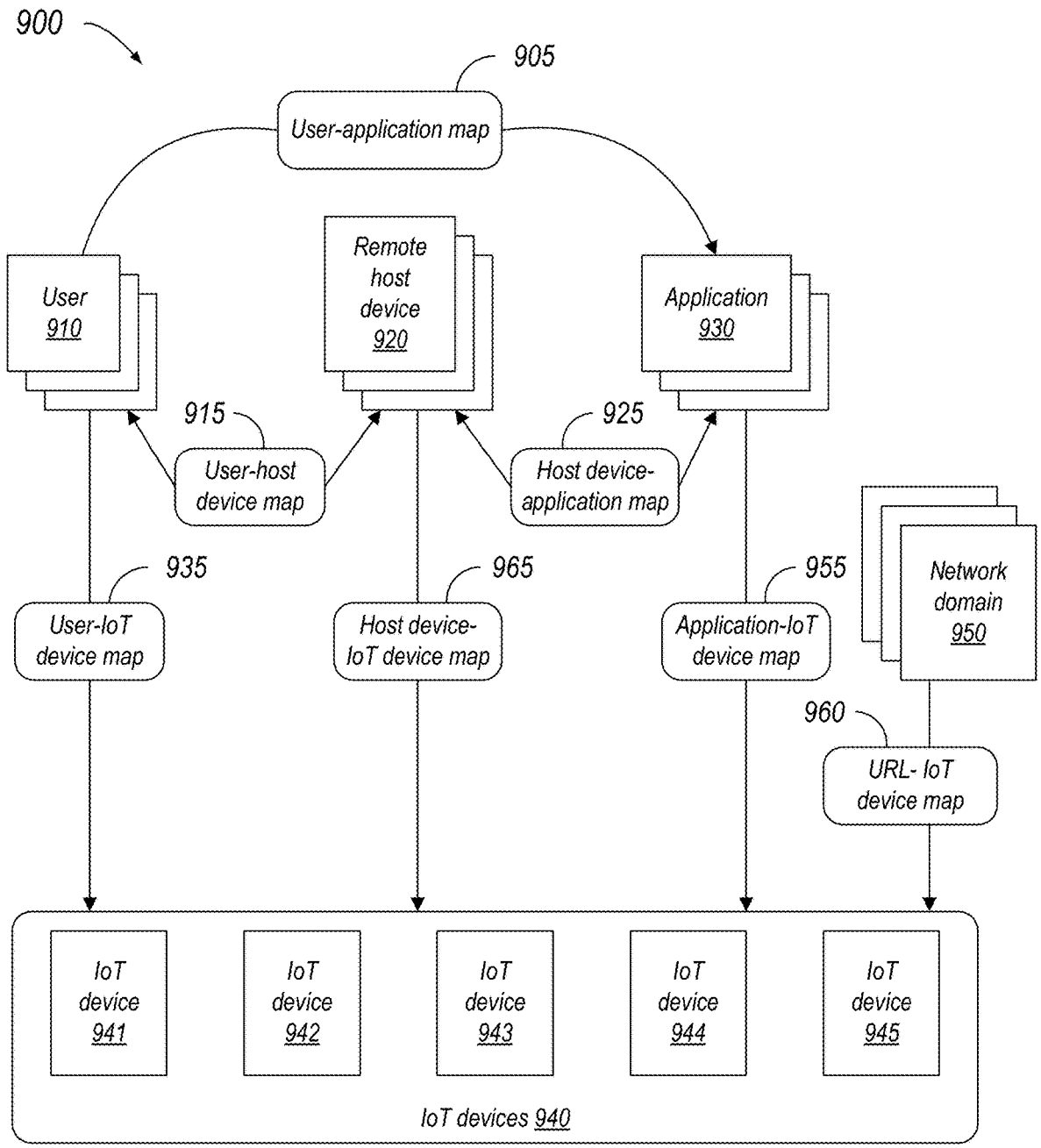
FIG. 9 illustrates a graphic representation of multiple access maps for controlling access to one or more Internet of Things (IoT) devices using a multilayer access control layer, according to at least some embodiments of the present disclosure.

FIG. 9 illustrates a graphic representation 900 of a multiple access maps for controlling access to one or more Internet of Things (IoT) devices 940 using a multilayer access control layer, according to at least some embodiments of the present disclosure. These access maps may maintain rules from which to dynamically generate access policies, including definitions of access rights for various users 910, remote host devices 920, applications 930, and network domains (based on their URLs) with respective to IoT devices 940, including any or all of IoT device 941, IoT device 942, IoT device 943, IoT device 944, and/or IoT device 945. In some embodiments, at least some of the mappings may be defined by a user, such as a highly privileged user, or by an administrator of the hub.

In some embodiments, two or more of the IoT devices within IoT devices 940 may be different types, makes, or models of devices. In some embodiments, two or more of the IoT devices within IoT devices 940 may be manufactured and/or provided by different manufacturers or suppliers. In this example, each of the access maps illustrated in FIG. 9 may store information representing rules, including definitions of access rights, for multiple pairings of entities of two entity types.

In this example, User-IoT device map 935 may store information indicating the respective rights of particular users 910 to access particular IoT devices 940. User-host device map 915 may store information indicating the respective rights of particular users 910 to access IoT devices 940 using particular remote host devices 920. User-application device map 905 may store information indicating the respective rights of particular users 910 to access IoT devices 940 using particular applications 930. Host device-IoT device map 965 may store information indicating the respective rights of particular remote host devices 920 to access particular IoT devices 940. Host device-application map 925 may store information indicating the respective rights of particular remote host devices 920 to access IoT devices 940 using particular applications 930. Application-IoT device map 955 may store information indicating the respective rights of particular applications 930 to access particular IoT devices 940. URL-IoT device map 960 may store information indicating the respective rights of web services executing in particular network domains 950 to access particular IoT devices 940. In some embodiments, access policy rules maintained in one or more of the access maps 900 may be obtained to create a hash of an access control policy for a given received access request.

In other embodiments, access maps 900 may include more, fewer, or different access maps than those illustrated in FIG. 9. For example, access maps 900 may include a user-controller device map that stores information indicating which users have rights to control or access a given feature of the hub; a user-IoT device feature map that stores information indicating which users have rights to control or access a given feature of an IoT device; or a controller device-application map that stores information indicating which applications have rights to access or configure the hub instead of, or in addition to, any of the access maps 905, 915, 925, 935, 955, 960, and/or 965 illustrated in FIG. 9.

In at least some embodiments, rather than storing all-inclusive or individual access policies for handling every possible combination of users, applications, commands and queries, remote host devices, and network domains associated with all possible access requests that might be received by the multilayer access control layer, the multilayer access control layer may include a policy generation and filtering sublayer that dynamically generates access policies for specific access requests on a demand basis.

FIG. 10 is flow diagram illustrating a method 1000 for dynamically generating and applying an access policy that is specific to a received request to access a network enabled device, according to at least some embodiments of the present disclosure. Method 1000 may be implemented by any of the elements shown in FIGS. 1-2. Method 1000 may be initiated by any suitable criteria and may initiate operation at any suitable point. In one embodiment, method 1000 may initiate operation at 1005. Method 1000 may include greater or fewer operations than those illustrated. Moreover, method 1000 may execute its operations in an order different than those illustrated below. Method 1000 may terminate at any suitable operation. Moreover, method 1000 may repeat operation at any suitable operation. Method 1000 may perform any of its operations in parallel with other operations of method 1000, or in parallel with operations of other methods. Furthermore, method 1000 may be executed multiple times to dynamically generate and apply a respective access policy to various received access requests. Based upon the results of method 1000, other methods may be invoked. In some embodiments, method 1000 may be invoked during the execution of method 300 to perform some of the operations of method 300.

In this example embodiment, method 1000 includes, at 1005, receiving, at a policy generation and filtering sublayer of a multilayer access control layer, following pre-processing by the user access control sublayer, application access control sublayer, network access control sublayer, and device access control sublayer, an access request, command, or query directed to a network enabled device. The access request, command, or query may include a policy checking request, such as a policy checking request generated by a method, such as method 800 illustrated in FIG. 8, based on the access control tags associated with the access request, command, or query by the other access control sublayers.

At 1010, the method may include dynamically generating, from multiple access maps, each of which maps information for multiple pairings of entities of two types (including users, remote host devices, applications, network domains, and network enabled devices), an access policy specific to the request. At 1015, method 1000 may optionally include caching or otherwise storing the generated access policy for potential subsequent reuse. For example, a subset of the access policies generated by the policy generation and filtering sublayer may be cached within a memory on the hub so that they do not need to be dynamically regenerated on-demand when at least some of the most frequently issued access requests, commands, or queries directed to particular network enabled devices are received.

At 1020, in this example, the generated access policy is applied to the policy checking request to determine whether the request is to be allowed or denied. For example, the policy checking request may include a hash generated according to the control tags associated with the access request, which may be compared against the generated access policy. If, at 1025, it is determined that the request is allowable according to the generated access policy, method 1000 may proceed to 1030, where the access request, command, or query is allowed to be provided to the network enabled device. Otherwise, method 1000 may proceed to 1035, where the access request, command, or query is prevented from being provided to the network enabled device. For example, allowing the access request, command, or query may include issuing, by any suitable component of the hub on which the multilayer access control layer resides, the access request, command, or query to the target network enabled device. Preventing the access request, command, or query from being provided to the network enabled device may include denying or blocking the request from being issued to the target network enabled device and/or logging the request for subsequent evaluation by an administrator of the hub.

In various embodiments, method 1000 may be implemented in any suitable manner on a wireless hub, such as by a program, application, script, function, library, code, software, firmware, hardware, or other mechanisms for carrying out the functionality described herein. In other embodiments, method 1000 may be implemented in any suitable manner by another component of a system that controls accesses to network enabled devices, such as IoT devices.

As described in detail herein, a multilayer access control layer may enforce a wrapper of permissions and access rules over each of the IoT devices coupled to a smart device hub on which the multilayer access control layer resides, regardless of the make or model of the IoT device. Thus, the IoT devices might only respond to users, devices, applications, or services that are authorized to access them, as defined by the hub. In addition, only the features of an IoT device that are available according to the policy maps may be exposed. The device on which the multilayer access control layer is implemented, such as a smart hub, may include any device that can funnel all IoT device traffic to the appropriate IoT devices after applying the control techniques of the present disclosure. Such a device may include a device to which the IoT edge devices already connect. Furthermore, such a device may include a device through which all of the IoT device traffic is redirected.

A representation of one example access policy for a specific access request is shown below in Table 1. In this example, the access policy is for an access request that targets an IoT device D1 on behalf of a user U1. The access request represents a command to move the target IoT device to a particular one of several desired states, shown as states A, B, and C. In some embodiments, the access policy represented in Table 1 may have been dynamically generated based on information obtained from one or more access maps maintained on, by, or on behalf of, the multilayer access control layer. In one embodiment, the access policy represented in Table 1 may have been dynamically generated based on access information obtained from any of the access maps 905, 915, 925, 935, 955, 960, and/or 965 illustrated in FIG. 9 and described above. In another embodiment, the access policy represented in Table 1 may be a default access policy for the IoT device D1 or for IoT devices of the same class, type, make, and/or model as IoT device D1. In yet another embodiment, the access policy represented in Table 1 may be an access policy that was defined by an administrator of the hub for the IoT device D1 or for IoT devices of the same class, type, make, and/or model as IoT device D1.

TABLE 1

Example access policy

| Desired State | Remote Host Device | Application | Permission |
|---|---|---|---|
| A | X | P | Allowed |
| A | X | !P | Denied |
| A | !X | NA | Denied |
| B | NA | NA | Allowed |
| C | NA | NA | Denied |

In this example, the user U1 and the target IoT device D1 are known, and the access policy is specific to this combination of user and target IoT device. In this example, if the user U1 wishes to issue a command to cause the IoT device D1 to change its state to state A, the requested command should be allowed if it is received from application P executing on remote host device X. However, if the requested command is received from an application other than application P (denoted as !P) that is executing on remote host device X, the request should be denied. In addition, if the requested command is received from an application (any application) that is executing on a remote host device other than remote host device X (denoted as !X), the request should be denied.

In this example, if the user U1 wishes to issue a command to cause the IoT device D1 to change its state to state B, the requested command should be allowed regardless of the application from which it is received and the remote host device on which that application is executing. Conversely, if the user U1 wishes to issue a command to cause the IoT device D1 to change its state to state C, the requested command should be denied regardless of the application from which it is received and the remote host device on which that application is executing.

As discussed in detail herein, a system for controlling accesses to network enabled devices that includes a multi-layer access control layer may be able to enforce access control permissions through a hash or matrix of user access permissions, device access permissions, application access permissions and network (URL/IP) access permissions on desperate IoT devices without modifying their stacks. This approach differs from existing access control mechanisms in at least the following ways:

- It provides the ability to enforce access control permissions, e.g., as a hash of user access permission, device access permission, application access permission and network (URL/IP) access permission on disparate network enabled devices without modifying their hardware or their software stacks.
- It provides the ability to restrict or allow all or specific commands received from authorized devices by dynamically determining whether or not the command is received from a known and approved (or safe) device.
- It provides the ability to restrict or allow all or specific commands received from authorized applications by dynamically determining whether or not the command is received from a known and approved (or safe) application.
- It provides the ability to restrict or allow all or specific commands received from various source networks by dynamically detecting the source network and determining whether or not the command is received from a known and approved (or safe) web service and/or server.
- It provides the ability to restrict or allow commands to access specific features of network enabled devices by dynamically determining the intent of the command and whether or not the user on whose behalf the command is received has privileges to exercise that particular feature on that particular device.

The system may, for example, allow a child to access light bulbs and fans but not to access safes or particular network enabled door locks. The system may allow a child to switch off hazardous devices but not to switch them on through, for example, application command filtering combined with user filtering. The system may allow a guest to have access to only a subset of IoT devices in a network, such as to access light bulbs and fans but not to access safes or network enabled bedroom door locks. The system may allow a child to access a television only between predefined hours. If a non-registered controller with proper user authentication attempts to access an IoT device, the access request might be initially denied, but logged for approval by an administrator or an authorized user of a higher privileged recognized application or registered remote host device. The access might be approved and passed through based upon the subsequent approval. If an unrecognized application launches on a registered remote host device, it might not be able to see all IoT devices in the home until a higher privileged user, application, or device approves such access. In one embodiment, if an application launches on an unregistered remote host device it might only be able to see the IoT devices available to guests. In some embodiments, the system may detect when an anomalous interaction has occurred, such as an unregistered device trying to access a door lock, and the system may block it. The system may also log the denial of the access, thus notifying an administrator.

Although the present disclosure has been described in detail, it should be understood that various changes, substitutions, and alterations can be made hereto without departing from the spirit and the scope of the disclosure as defined by the appended claims.

Some embodiments of the present disclosure include at least one non-transitory machine readable storage medium. The medium may include computer-executable instructions carried on the machine readable medium, the instructions being readable by a processor. The instructions, when read and executed, may cause the processor to detect, at a hub in wireless communication with a network enabled device, a request representing an attempt by an application executing on a remote host device to access the network enabled device, to characterize the request according to a user of the remote host device, the application making the attempt, and the network enabled device, and to determine whether to allow or deny the request based upon the characterization and a plurality of rules, the rules including definitions of access rights for one or more users with respect to the network enabled device and definitions of access rights for one or more applications with respect to the network enabled device.

In combination with any of the above embodiments, the medium may further include instructions for causing the processor to characterize the request using an access control layer on the hub, the access control layer including a plurality of sublayers, to filter the request, using a user access control sublayer of the access control layer, dependent on the user of the remote host device, to associate a user tag with the request, the user tag indicating whether or not the user is registered with the access control layer on the hub, to filter the request, using an application access control sublayer of the access control layer, dependent on the application making the attempt, to associate an application tag with the request, the application tag indicating whether or not the application is recognized by the access control layer on the hub, to filter the request, using a device access control sublayer of the access control layer, dependent on the remote host device, and to associate a device tag with the request, the device tag indicating whether or not the remote host device is registered with the access control layer on the hub.

In combination with any of the above embodiments, the request may represent an attempt by an application executing on a remote host device to issue a particular command or query to the network enabled device. To filter the request, using an application access control sublayer of the access control layer, the medium may further include instructions for causing the processor to filter the request, using the application access control sublayer of the access control layer, dependent on the particular command or query. The application tag may further indicate whether or not the particular command or query is recognized by the access control layer on the hub as a command or query that is safe to issue to the network enabled device or that is approved for issuance to the network enabled device by the user.

In combination with any of the above embodiments, the medium may further include instructions for causing the processor to filter the request, using a network access control sublayer of the access control layer, dependent on a network domain of a service through which the application is making the attempt, to allow the request to be passed to the network enabled device, responsive to a determination that the network domain is known to be safe, and to log the request without passing it to the network enabled device, responsive to a determination that the network domain is known to be unsafe or is unknown.

In combination with any of the above embodiments, the medium may further include instructions for causing the processor to determine, using the network access control sublayer of the access control layer, whether the request was received from a remote host device on a local area network through which the network enabled and the hub are communicatively coupled, and to allow the request to be passed to the network enabled device responsive to a determination that the request was received from a remote host device on the local area network through which the network enabled and the hub are communicatively coupled.

In any of the above embodiments, the user tag may indicate that the user is registered with the access control layer on the hub, and the user tag may include a unique identifier of the user.

In any of the above embodiments, the user tag may include a generic user identifier.

In any of the above embodiments, the application tag may indicate that the application is recognized by the access control layer on the hub, and the application tag may include a unique identifier of the application.

In any of the above embodiments, the application tag may include a generic application identifier.

In any of the above embodiments, the device tag may indicate that the remote host device is registered with the access control layer on the hub, and the device tag may include a unique identifier of the remote host device.

In any of the above embodiments, the device tag may include a generic device identifier.

In any of the above embodiments, the request may represent an attempt by an application executing on a remote host device to issue a command to the network enabled device.

In any of the above embodiments, the request may represent an attempt by an application executing on a remote host device to issue a query to the network enabled device.

In combination with any of the above embodiments, the medium may further include instructions for causing the processor to obtain the plurality of rules from multiple access maps stored in a memory on the hub, each access map storing access information for multiple pairings of entities of two of a plurality of entity types, the plurality of entity types including users, remote host devices, applications, network domains, and network enabled devices.

In combination with any of the above embodiments, to determine whether to allow or deny the request, the medium may further include instructions for causing the processor to generate, from the plurality of rules obtained from multiple access maps, an access policy that is specific to the request, and to evaluate the request and one or more tags associated with the request with respect to the generated access policy.

In combination with any of the above embodiments, the medium may further include instructions for causing the processor to store the generated access policy in a cache on the hub, and to evaluate a second request representing an attempt by the application executing on the remote host device to access the network enabled device and one or more tags associated with the second request with respect to the generated access policy without regenerating it.

Some embodiments of the present disclosure include a system for controlling accesses to connected devices. The system may include a network interface over which a hub is to communicate wirelessly with one or more network enabled devices, a processor, and at least one non-transitory machine readable storage medium communicatively coupled to the processor. The medium may include computer-executable instructions carried on the machine readable medium, the instructions being readable by the processor. The instructions, when read and executed, may cause the processor to detect, at the hub, a request representing an attempt by an application executing on a remote host device to access a network enabled device in wireless communication with the hub over the network interface, to characterize the request according to a user of the remote host device, the application making the attempt, and the network enabled device, and to determine whether to allow or deny the request based upon the characterization and a plurality of rules, the rules including definitions of access rights for one or more users with respect to the network enabled device and definitions of access rights for one or more applications with respect to the network enabled device.

In combination with any of the above embodiments, the medium may further include instructions for causing the processor to characterize the request using an access control layer on the hub, the access control layer including a plurality of sublayers, to filter the request, using a user access control sublayer of the access control layer, dependent on the user of the remote host device, to associate a user tag with the request, the user tag indicating whether or not the user is registered with the access control layer on the hub, to filter the request, using an application access control sublayer of the access control layer, dependent on the application making the attempt, to associate an application tag with the request, the application tag indicating whether or not the application is recognized by the access control layer on the hub, to filter the request, using a device access control sublayer of the access control layer, dependent on the remote host device, and to associate a device tag with the request, the device tag indicating whether or not the remote host device is registered with the access control layer on the hub.

In combination with any of the above embodiments, the request may represent an attempt by an application executing on a remote host device to issue a particular command or query to the network enabled device. To filter the request, using an application access control sublayer of the access control layer, the medium may further include instructions for causing the processor to filter the request, using the application access control sublayer of the access control layer, dependent on the particular command or query. The application tag may further indicate whether or not the particular command or query is recognized by the access control layer on the hub as a command or query that is safe to issue to the network enabled device or that is approved for issuance to the network enabled device by the user.

In combination with any of the above embodiments, the medium may further include instructions for causing the processor to filter the request, using a network access control sublayer of the access control layer, dependent on a network domain of a service through which the application is making the attempt, to allow the request to be passed to the network enabled device, responsive to a determination that the network domain is known to be safe, and to log the request without passing it to the network enabled device, responsive to a determination that the network domain is known to be unsafe or is unknown.

In combination with any of the above embodiments, the medium may further include instructions for causing the processor to determine, using the network access control sublayer of the access control layer, whether the request was received from a remote host device on a local area network through which the network enabled and the hub are communicatively coupled, and to allow the request to be passed to the network enabled device responsive to a determination that the request was received from a remote host device on the local area network through which the network enabled and the hub are communicatively coupled.

In any of the above embodiments, the user tag may indicate that the user is registered with the access control layer on the hub, and the user tag may include a unique identifier of the user.

In any of the above embodiments, the user tag may include a generic user identifier.

In any of the above embodiments, the application tag may indicate that the application is recognized by the access control layer on the hub, and the application tag may include a unique identifier of the application.

In any of the above embodiments, the application tag may include a generic application identifier.

In any of the above embodiments, the device tag may indicate that the remote host device is registered with the access control layer on the hub, and the device tag may include a unique identifier of the remote host device.

In any of the above embodiments, the device tag may include a generic device identifier.

In any of the above embodiments, the request may represent an attempt by an application executing on a remote host device to issue a command to the network enabled device.

In any of the above embodiments, the request may represent an attempt by an application executing on a remote host device to issue a query to the network enabled device.

In combination with any of the above embodiments, the medium may further include instructions for causing the processor to obtain the plurality of rules from multiple access maps stored in a memory on the hub, each access map storing access information for multiple pairings of entities of two of a plurality of entity types, the plurality of entity types including users, remote host devices, applications, network domains, and network enabled devices.

In combination with any of the above embodiments, to determine whether to allow or deny the request, the medium may further include instructions for causing the processor to generate, from the plurality of rules obtained from multiple access maps, an access policy that is specific to the request, and to evaluate the request and one or more tags associated with the request with respect to the generated access policy.

In combination with any of the above embodiments, the medium may further include instructions for causing the processor to store the generated access policy in a cache on the hub, and to evaluate a second request representing an attempt by the application executing on the remote host device to access the network enabled device and one or more tags associated with the second request with respect to the generated access policy without regenerating it.

In combination with any of the above embodiments, the system may further include one or more network enabled devices in wireless communication with the hub.

Some embodiments of the present disclosure include a method for controlling accesses to connected devices. The method may include detecting, at a hub in wireless communication with a network enabled device, a request representing an attempt by an application executing on a remote host device to access the network enabled device, characterizing the request according to a user of the remote host device, the application making the attempt, and the network enabled device, and determining whether to allow or deny the request based upon the characterization and a plurality of rules, the rules including definitions of access rights for one or more users with respect to the network enabled device and definitions of access rights for one or more applications with respect to the network enabled device.

In combination with any of the above embodiments, the method may further include characterizing the request using an access control layer on the hub, the access control layer including a plurality of sublayers, filtering the request, using a user access control sublayer of the access control layer, dependent on the user of the remote host device, associating a user tag with the request, the user tag indicating whether or not the user is registered with the access control layer on the hub, filtering the request, using an application access control sublayer of the access control layer, dependent on the application making the attempt, associating an application tag with the request, the application tag indicating whether or not the application is recognized by the access control layer on the hub, filtering the request, using a device access control sublayer of the access control layer, dependent on the remote host device, and associating a device tag with the request, the device tag indicating whether or not the remote host device is registered with the access control layer on the hub.

In combination with any of the above embodiments, the request may represent an attempt by an application executing on a remote host device to issue a particular command or query to the network enabled device. Filtering the request, using an application access control sublayer of the access control layer, may include filtering the request, using the application access control sublayer of the access control layer, dependent on the particular command or query. The application tag may further indicate whether or not the particular command or query is recognized by the access control layer on the hub as a command or query that is safe to issue to the network enabled device or that is approved for issuance to the network enabled device by the user.

In combination with any of the above embodiments, the method may further include filtering the request, using a network access control sublayer of the access control layer, dependent on a network domain of a service through which the application is making the attempt, and logging the request without passing it to the network enabled device, in response to determining that the network domain is known to be unsafe or is unknown.

In combination with any of the above embodiments, the method may further include filtering the request, using a network access control sublayer of the access control layer, dependent on a network domain of a service through which the application is making the attempt, and allowing the request to be passed to the network enabled device, responsive to a determination that the network domain is known to be safe.

In combination with any of the above embodiments, the method may further include determining, using the network access control sublayer of the access control layer, whether the request was received from a remote host device on a local area network through which the network enabled and the hub are communicatively coupled, and allowing the request to be passed to the network enabled device responsive to a determination that the request was received from a remote host device on the local area network through which the network enabled and the hub are communicatively coupled.

In any of the above embodiments, the user tag may indicate that the user is registered with the access control layer on the hub, and the user tag may include a unique identifier of the user.

In any of the above embodiments, the user tag may include a generic user identifier.

In any of the above embodiments, the application tag may indicate that the application is recognized by the access control layer on the hub, and the application tag may include a unique identifier of the application.

In any of the above embodiments, the application tag may include a generic application identifier.

In any of the above embodiments, the device tag may indicate that the remote host device is registered with the access control layer on the hub, and the device tag may include a unique identifier of the remote host device.

In any of the above embodiments, the device tag may include a generic device identifier.

In any of the above embodiments, the request may represent an attempt by an application executing on a remote host device to issue a command to the network enabled device.

In any of the above embodiments, the request may represent an attempt by an application executing on a remote host device to issue a query to the network enabled device.

In combination with any of the above embodiments, the method may further include obtaining the plurality of rules from multiple access maps stored in a memory on the hub, each access map storing access information for multiple pairings of entities of two of a plurality of entity types, the plurality of entity types including users, remote host devices, applications, network domains, and network enabled devices.

In combination with any of the above embodiments, determining whether to allow or deny the request may include generating, from the plurality of rules obtained from multiple access maps, an access policy that is specific to the request, and evaluating the request and one or more tags associated with the request with respect to the generated access policy.

In combination with any of the above embodiments, the method may further include storing the generated access policy in a cache on the hub, and evaluating a second request representing an attempt by the application executing on the remote host device to access the network enabled device and one or more tags associated with the second request with respect to the generated access policy without regenerating it.

Some embodiments of the present disclosure include a system for controlling accesses to connected devices. The system may include means for detecting, at a hub in wireless communication with a network enabled device, a request representing an attempt by an application executing on a remote host device to access the network enabled device, means for characterizing the request according to a user of the remote host device, the application making the attempt, and the network enabled device, and means for determining whether to allow or deny the request based upon the characterization and a plurality of rules, the rules including definitions of access rights for one or more users with respect to the network enabled device and definitions of access rights for one or more applications with respect to the network enabled device.

In combination with any of the above embodiments, the system may further include means for characterizing the request using an access control layer on the hub, the access control layer including a plurality of sublayers, means for filtering the request, using a user access control sublayer of the access control layer, dependent on the user of the remote host device, means for associating a user tag with the request, the user tag indicating whether or not the user is registered with the access control layer on the hub, means for filtering the request, using an application access control sublayer of the access control layer, dependent on the application making the attempt, means for associating an application tag with the request, the application tag indicating whether or not the application is recognized by the access control layer on the hub, means for filtering the request, using a device access control sublayer of the access control layer, dependent on the remote host device, and means for associating a device tag with the request, the device tag indicating whether or not the remote host device is registered with the access control layer on the hub.

In combination with any of the above embodiments, the request may represent an attempt by an application executing on a remote host device to issue a particular command or query to the network enabled device, the means for filtering the request, using an application access control sublayer of the access control layer, may include means for filtering the request, using the application access control sublayer of the access control layer, dependent on the particular command or query, the application tag may further indicate whether or not the particular command or query is recognized by the access control layer on the hub as a command or query that is safe to issue to the network enabled device or that is approved for issuance to the network enabled device by the user.

In combination with any of the above embodiments, the system may further include means for filtering the request, using a network access control sublayer of the access control layer, dependent on a network domain of a service through which the application is making the attempt, and means for logging the request without passing it to the network enabled device, in response to determining that the network domain is known to be unsafe or is unknown.

In combination with any of the above embodiments, the system may further include means for filtering the request, using a network access control sublayer of the access control layer, dependent on a network domain of a service through which the application is making the attempt, and means for allowing the request to be passed to the network enabled device, responsive to a determination that the network domain is known to be safe.

In combination with any of the above embodiments, the system may further include means for determining, using the network access control sublayer of the access control layer, whether the request was received from a remote host device on a local area network through which the network enabled and the hub are communicatively coupled, and means for allowing the request to be passed to the network enabled device responsive to a determination that the request was received from a remote host device on the local area network through which the network enabled and the hub are communicatively coupled.

In any of the above embodiments, the user tag may indicate that the user is registered with the access control layer on the hub, and the user tag may include a unique identifier of the user.

In any of the above embodiments, the user tag may include a generic user identifier.

In any of the above embodiments, the application tag may indicate that the application is recognized by the access control layer on the hub, and the application tag may include a unique identifier of the application.

In any of the above embodiments, the application tag may include a generic application identifier.

In any of the above embodiments, the device tag may indicate that the remote host device is registered with the access control layer on the hub, and the device tag may include a unique identifier of the remote host device.

In any of the above embodiments, the device tag may include a generic device identifier.

In any of the above embodiments, the request may represent an attempt by an application executing on a remote host device to issue a command to the network enabled device.

In any of the above embodiments, the request may represent an attempt by an application executing on a remote host device to issue a query to the network enabled device.

In combination with any of the above embodiments, the system may further include means for obtaining the plurality of rules from multiple access maps stored in a memory on the hub, each access map storing access information for multiple pairings of entities of two of a plurality of entity types, the plurality of entity types including users, remote host devices, applications, network domains, and network enabled devices.

In combination with any of the above embodiments, the means for determining whether to allow or deny the request may include means for generating, from the plurality of rules obtained from multiple access maps, an access policy that is specific to the request, and means for evaluating the request and one or more tags associated with the request with respect to the generated access policy.

In combination with any of the above embodiments, the system may further include means for storing the generated access policy in a cache on the hub, and means for evaluating a second request representing an attempt by the application executing on the remote host device to access the network enabled device and one or more tags associated with the second request with respect to the generated access policy without regenerating it.

What is claimed is:

1. At least one non-transitory machine-readable storage medium, comprising computer-executable instructions carried on the machine readable medium, the instructions readable by a processor, the instructions, when read and executed, for causing the processor to:
   detect, at a hub in wireless communication with a network-enabled device, a request representing an attempt by an application executing on a remote host device to access the network-enabled device;
   characterize the request according to a user of the remote host device, the application making the attempt, and the network-enabled device using an access control layer on the hub, the access control layer to include a plurality of sublayers;
   filter the request using at least two of: a user access control sublayer of the access control layer, dependent on the user of the remote host device; an application access control sublayer of the access control layer, dependent on the application making the attempt; and a device access control sublayer of the access control layer, dependent on the remote host device;
   corresponding to the filtering, associate at least two of: a user tag with the request, the user tag indicating whether or not the user is registered with the access control layer on the hub; an application tag with the request, the application tag indicating whether or not the application is recognized by the access control layer on the hub; and a device tag with the request, the device tag indicating whether or not the remote host device is registered with the access control layer on the hub; and
   block the request based upon the characterization and a plurality of rules, the rules to include definitions of access rights for one or more users with respect to the network-enabled device and definitions of access rights for one or more applications with respect to the network-enabled device,
   wherein one of the at least two of the user tag, the application tag, and the device tag includes another of the user tag, the application tag, and the device tag.

2. The medium of claim 1, wherein:
   the request represents an attempt by an application executing on a remote host device to issue a particular command or query to the network-enabled device;
   to filter the request, using the application access control sublayer of the access control layer, the medium further comprises instructions for causing the processor to:
      filter the request, using the application access control sublayer of the access control layer, dependent on the particular command or query;
   the application tag further indicates whether or not the particular command or query is recognized by the access control layer on the hub as a command or query that is safe to issue to the network-enabled device or that is approved for issuance to the network-enabled device by the user.

3. The medium of claim 1, further comprising instructions for causing the processor to:
   filter the request, using a network access control sublayer of the access control layer, dependent on a network domain of a service through which the application is making the attempt;
   block the request to be passed to the network-enabled device, responsive to a determination that the network domain is known to be unsafe;

log the request without passing it to the network-enabled device, responsive to a determination that the network domain is known to be unsafe or is unknown.

4. The medium of claim 3, further comprising instructions for causing the processor to:
determine, using the network access control sublayer of the access control layer, whether the request was received from a remote host device on a local area network through which the network-enabled device and the hub are communicatively coupled;
block the request to be passed to the network-enabled device responsive to a determination that the request was not received from a remote host device on the local area network through which the network-enabled device and the hub are communicatively coupled.

5. The medium of claim 1, wherein the request represents an attempt by an application executing on a remote host device to issue a command to the network-enabled device.

6. The medium of claim 1, wherein the request represents an attempt by an application executing on a remote host device to issue a query to the network-enabled device.

7. The medium of claim 1, further comprising instructions for causing the processor to:
obtain the plurality of rules from multiple access maps stored in a memory on the hub, each access map to store access information for multiple pairings of entities of two of a plurality of entity types, the plurality of entity types including users, remote host devices, applications, network domains, and network-enabled devices.

8. The medium of claim 1, wherein to determine whether to allow or deny the request, the medium further comprises instructions for causing the processor to:
generate, from the plurality of rules obtained from multiple access maps, an access policy that is specific to the request;
evaluate the request and one or more tags associated with the request with respect to the generated access policy.

9. The medium of claim 8, further comprising instructions for causing the processor to:
store the generated access policy in a cache on the hub;
evaluate a second request representing an attempt by the application executing on the remote host device to access the network-enabled device and one or more tags associated with the second request with respect to the generated access policy without regenerating it.

10. A system, comprising:
a network interface over which a hub is to communicate wirelessly with one or more network-enabled devices;
a processor;
at least one non-transitory machine-readable storage medium communicatively coupled to the processor, the medium comprising computer-executable instructions carried on the machine readable medium, the instructions readable by the processor, the instructions, when read and executed, for causing the processor to:
detect, at the hub, a request representing an attempt by an application executing on a remote host device to access a network-enabled device of the one or more network-enabled devices in wireless communication with the hub over the network interface;
characterize the request according to a user of the remote host device, the application making the attempt, and the network-enabled device using an access control layer on the hub, the access control layer to include a plurality of sublayers;
filter the request using at least two of: a user access control sublayer of the access control layer, dependent on the user of the remote host device; an application access control sublayer of the access control layer, dependent on the application making the attempt; and a device access control sublayer of the access control layer, dependent on the remote host device;
corresponding to the filtering, associate at least two of: a user tag with the request, the user tag indicating whether or not the user is registered with the access control layer on the hub; an application tag with the request, the application tag indicating whether or not the application is recognized by the access control layer on the hub; and a device tag with the request, the device tag indicating whether or not the remote host device is registered with the access control layer on the hub; and
block the request based upon the characterization and a plurality of rules, the rules to include definitions of access rights for one or more users with respect to the network-enabled device and definitions of access rights for one or more applications with respect to the network-enabled device,
wherein one of the at least two of the user tag, the application tag, and the device tag includes another of the user tag, the application tag, and the device tag.

11. The system of claim 10, wherein:
the request represents an attempt by an application executing on a remote host device to issue a particular command or query to the network-enabled device;
to filter the request, using the application access control sublayer of the access control layer, the medium further comprises instructions for causing the processor to:
filter the request, using the application access control sublayer of the access control layer, dependent on the particular command or query;
the application tag further indicates whether or not the particular command or query is recognized by the access control layer on the hub as a command or query that is safe to issue to the network-enabled device or that is approved for issuance to the network-enabled device by the user.

12. The system of claim 10, wherein the medium further comprises instructions for causing the processor to:
filter the request, using a network access control sublayer of the access control layer, dependent on a network domain of a service through which the application is making the attempt;
block the request to be passed to the network-enabled device, responsive to a determination that the network domain is known to be unsafe;
log the request without passing it to the network-enabled device, responsive to a determination that the network domain is known to be unsafe or is unknown.

13. The system of claim 10, wherein the medium further comprises instructions for causing the processor to:
obtain the plurality of rules from multiple access maps stored in a memory on the hub, each access map to store access information for multiple pairings of entities of two of a plurality of entity types, the plurality of entity types including users, remote host devices, applications, network domains, and network-enabled devices.

14. The system of claim 10, further comprising the one or more network-enabled devices in wireless communication with the hub.

15. A method, comprising:
- detecting, at a hub in wireless communication with a network-enabled device, a request representing an attempt by an application executing on a remote host device to access network-enabled device;
- characterizing the request according to a user of the remote host device, the application making the attempt, and the network-enabled device using an access control layer on the hub, the access control layer to include a plurality of sublayers;
- filtering the request using at least two of: a user access control sublayer of the access control layer, dependent on the user of the remote host device; an application access control sublayer of the access control layer, dependent on the application making the attempt; and a device access control sublayer of the access control layer, dependent on the remote host device;
- corresponding to the filtering, associating at least two of: a user tag with the request, the user tag indicating whether or not the user is registered with the access control layer on the hub; an application tag with the request, the application tag indicating whether or not the application is recognized by the access control layer on the hub; and a device tag with the request, the device tag indicating whether or not the remote host device is registered with the access control layer on the hub; and
- blocking the request based upon the characterization and a plurality of rules, the rules to include definitions of access rights for one or more users with respect to the network-enabled device and definitions of access rights for one or more applications with respect to the network-enabled device,
- wherein one of the at least two of the user tag, the application tag, and the device tag includes another of the user tag, the application tag, and the device tag.

16. The method of claim 15, wherein:
- the request represents an attempt by an application executing on a remote host device to issue a particular command or query to the network-enabled device;
- filtering the request, using the application access control sublayer of the access control layer, includes:
  - filtering the request, using the application access control sublayer of the access control layer, dependent on the particular command or query;
- the application tag further indicates whether or not the particular command or query is recognized by the access control layer on the hub as a command or query that is safe to issue to the network-enabled device or that is approved for issuance to the network-enabled device by the user.

17. The method of claim 15, further comprising:
- filtering the request, using a network access control sublayer of the access control layer, dependent on a network domain of a service through which the application is making the attempt;
- logging the request without passing it to the network-enabled device, in response to determining that the network domain is known to be unsafe or is unknown.

* * * * *